US011327266B2

(12) United States Patent
Chen et al.

(10) Patent No.: US 11,327,266 B2
(45) Date of Patent: May 10, 2022

(54) OPTICAL ASSEMBLY HAVING A HOUSING FOR MOUNTING OPTICAL LENSES

(71) Applicant: Facebook Technologies, LLC, Menlo Park, CA (US)

(72) Inventors: Aiqing Chen, Menlo Park, CA (US); Weihua Gao, Menlo Park, CA (US); Daozhi Wang, Menlo Park, CA (US); Ashvath Sharma, Menlo Park, CA (US); Matthew Erich, Menlo Park, CA (US); Mark Alan Tempel, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 198 days.

(21) Appl. No.: 16/355,136

(22) Filed: Mar. 15, 2019

(65) Prior Publication Data

US 2020/0292777 A1 Sep. 17, 2020

(51) Int. Cl.
*G02B 7/02* (2021.01)
*G02B 9/12* (2006.01)

(52) U.S. Cl.
CPC ............ *G02B 7/021* (2013.01); *G02B 7/022* (2013.01); *G02B 7/026* (2013.01); *G02B 9/12* (2013.01)

(58) Field of Classification Search
CPC ........ G02B 7/021; G02B 7/023; G02B 27/62; G02B 7/005; G02B 27/0172; G02B 7/022; G02B 7/026; G02B 9/12; A61B 3/00; A61B 3/14; A61B 3/152; A61B 3/02
See application file for complete search history.

(56) References Cited

U.S. PATENT DOCUMENTS

| | | | |
|---|---|---|---|
| 2016/0062071 A1* | 3/2016 | Hasegawa | G02B 7/021 359/739 |
| 2016/0147033 A1* | 5/2016 | Kudoh | G02B 7/021 359/793 |
| 2020/0292776 A1* | 9/2020 | Chen | G02B 27/62 |
| 2020/0292777 A1* | 9/2020 | Chen | G02B 7/022 |
| 2022/0026663 A1* | 1/2022 | Chen | G02B 7/021 |

* cited by examiner

*Primary Examiner* — Brandi N Thomas
(74) *Attorney, Agent, or Firm* — Millburn IP PLLC

(57) ABSTRACT

A housing assembly for mounting a first lens and a second lens includes a first lens holder. The first lens holder includes a ring-shaped structure configured to mount the first lens. The housing assembly also includes a second lens holder including a cup-shaped structure. The cup-shaped structure includes an upper portion configured to mount the first lens holder, and a lower portion configured to mount the second lens.

17 Claims, 28 Drawing Sheets

OPTICAL ASSEMBLY HAVING A HOUSING FOR MOUNTING OPTICAL LENSES

BACKGROUND

An optical lens assembly used in various optical devices may include two or more lens assembled and aligned with one another (e.g., aligned to have a predetermined optical relationship) to form a monolithic lens assembly. For example, a head-mounted display ("HMD") used in applications such as virtual reality ("VR") and/or augmented reality ("AR") may include a monolithic pancake lens assembly (or pancake lens) for directing lights into a user's eyes. A pancake lens assembly may be formed by a plurality of optical elements, such as a lens, a waveplate, a reflector, a polarizer. In some implementations, a pancake lens assembly may be formed by gluing two lens cells together to form an integral piece. The two lens cells, each including one or more optical elements, may be aligned with respect to one another to achieve a predetermined optical property.

Some optical lens assemblies, such as certain pancake lens assemblies, may be polarization sensitive. That is, a polarization effect of a lens assembly may be sensitive to a mis-alignment between the optical elements included in the lens assembly. Precise alignment between two lens cells may be required in order to achieve a predetermined polarization effect. In conventional systems, expensive equipment is used to achieve the required alignment precision when the optical elements are assembled, which results in a high manufacturing cost. In addition, the output quality control cost is high due to the high failure rate of the produced pancake lens assemblies (e.g., a high percentage of the produced pancake lens assemblies are wasted due to the failure to meet predetermined design specification). Finally, the cycle time for producing a pancake lens assembly is long in conventional systems.

The disclosed systems and methods can reduce the manufacturing costs, output quality control costs, and the cycle time.

BRIEF SUMMARY OF THE DISCLOSURE

One aspect of the present disclosure provides a housing assembly for mounting a first lens and a second lens. The housing assembly includes a first lens holder including a ring-shaped structure configured to mount the first lens. The housing assembly also includes a second lens holder including a cup-shaped structure. The cup-shaped structure includes an upper portion configured to mount the first lens holder, and a lower portion configured to mount the second lens.

Another aspect of the present disclosure provides an optical assembly. The optical assembly includes a first lens holder and a first lens mounted to the first lens holder. The optical assembly also includes a second lens holder and a second lens mounted to the second lens holder. The first lens holder is mounted to the second lens holder, and the first lens is aligned with the second lens with a surface of the first lens being in parallel with a surface of the second lens. The first lens holder is mounted to the second lens holder, and the first lens is aligned with the second lens with a surface of the first lens being in parallel with a surface of the second lens. The second lens holder includes an upper portion configured to mount the first lens holder, and a lower portion configured to mount the second lens.

A further aspect of the present disclosure provides an optical device. The optical device includes an optical assembly. The optical assembly includes a first lens holder and a first lens mounted to the first lens holder. The optical assembly also includes a second lens holder and a second lens mounted to the second lens holder. The first lens holder is mounted to the second lens holder, and the first lens is aligned with the second lens with a surface of the first lens being in parallel with a surface of the second lens. The second lens holder includes an upper portion configured to mount the first lens holder, and a lower portion configured to mount the second lens. The optical device also includes a display and a base cover configured to mount the display. The base cover is mounted to the second lens holder of the optical assembly.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
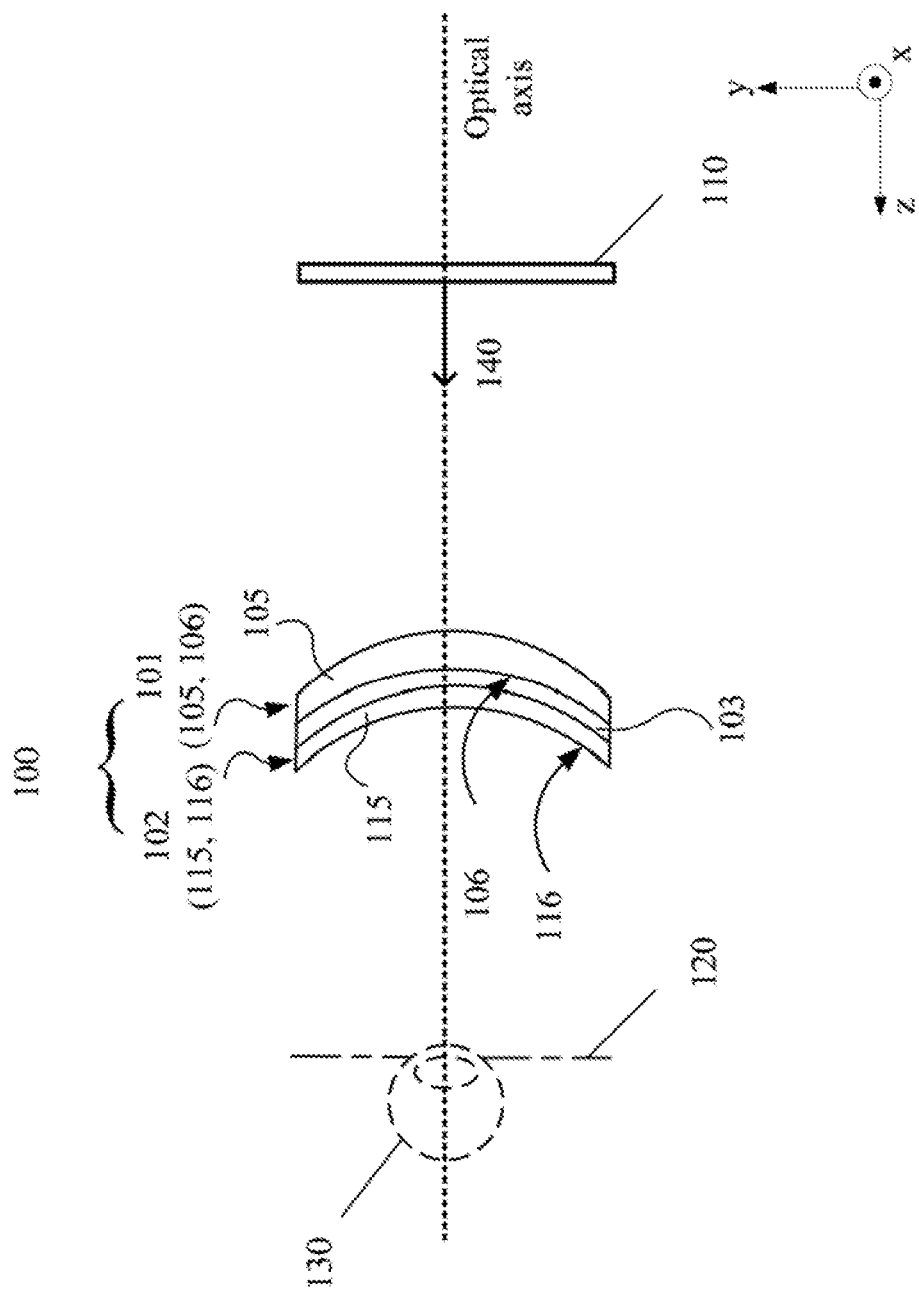
FIG. 1 illustrates a schematic diagram of a polarization sensitive optical assembly.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a system and a method for fully automated assembling and testing (or validating) of optical lenses. A fully automated assembling and testing system may include a first assembly and validation line and a second assembly and validation line. Lenses are first assembled and validated in the first assembly and validation line. If the assembled lens structure fails the validation or test, the assembled lens structure may be disassembled and moved to the second assembly and validation line for correcting at least one of a centering, a tilting, or a polarization effect (e.g., a polarimetric angle) of each of the lenses before the lenses are re-assembled.

In some embodiments, in the first assembly and validation line, a first lens may be press-fit into a first lens holder with a tightly controlled tolerance, and a second lens may be press-fit into a second lens holder with a tightly controlled tolerance. The first lens holder and the second lens holder may not include a centering or tilting adjustment mechanism. The first lens holder and the second lens holder may be coupled together to form a first optical assembly. A display may be coupled to the first optical assembly to form an optical device. A quality control test or validation of various optical properties may be performed on the first optical assembly using the display. If the first optical assembly fails the quality control test or validation, the first optical assembly may be transferred to a second assembly and validation line.

At the second assembly and validation line, simultaneous assembling and alignment may be achieved. First, the display may be separated from the first optical assembly, and the first optical assembly may be further disassembled (alternatively, the first optical assembly may be disassembled before moving to the second assembly and validation line) into individual pieces (e.g., first lens, second lens). Each of the first lens and the second lens may be placed into a respective lens holder that may include one or more mechanisms configured to adjust the orientation and/or position of the lens (e.g., centering and/or tilting of the lens). Each of the first lens and the second lens may be separately tested or measured for at least one of centering, tilting, or a polarization effect. When the measurement does not satisfy a predetermined condition relating to centering, tilting, or polarization effect, each of the first lens and the second lens may be separately adjusted. For example, the first lens and/or the second lens may be adjusted for centering, tilting, or polarization effect (e.g., a polarimetric angle of the lens). After the one or more adjustments are performed on the first lens and/or the second lens, the first lens and the second lens may be assembled to form a second optical assembly. The display may be coupled with the second optical assembly and a quality control test or validation (which may include an alignment validation) may be performed to validate an alignment between the first lens and the second lens using the display. Based on a result of the alignment validation, the first lens and the second lens may be fine-tuned if needed. When the result of the quality control test meets a predetermined condition, the coupling between the first lens, the second lens, and the display may be secured to form an optical device. The optical device may be used in various devices, such as a head-mounted display.

The fully automated assembling and testing system of the present disclosure first processes the optical assembly in the first assembly and validation line. If the optical assembly fails a quality control test, unlike the conventional systems that may discard the optical assembly as a defective product, the disclosed fully automated assembling and testing system transfers the failed optical assembly to a second assembly and validation line, where the failed optical assembly is disassembled into individual elements (e.g., first lens and second lens), and each individual lens is tested and/or adjusted for centering, tilting, and/or polarization effect (e.g., polarimetric angle). After the adjustments are performed, the first lens and the second lens may be re-assembled to form another optical assembly. The disclosed system can reduce the failure rate of the final product by processing the failed optical assembly through the second assembly and validation line. In addition, the disclosed system also reduces the cycle time by fully automating the processing of the lenses. As a result, the disclosed system can reduce the overall manufacturing costs as compared to conventional systems.

FIG. 1 illustrates an example polarization sensitive optical assembly 100. The polarization sensitive optical assembly 100 may be formed by at least two optical elements (e.g., at least two optical lenses). The polarization sensitive optical assembly 100 may be sensitive to the alignment (e.g., polarization alignment) of the at least two optical elements, as the polarization alignment may affect the output of the polarization sensitive optical assembly 100. In some embodiments, the polarization sensitive optical assembly 100 may include a pancake lens (or a pancake lens assembly) which may be used in an optical system, such as a head-mounted display ("HMD"), to fold the optical path, thereby reducing the back focal distance in the HMD. The polarization sensitive optical assembly 100 may include a first optical element 101 and a second optical element 102 arranged in optical series to direct light 140 from an electronic display 110 to an eye-box located at an exit pupil 120 and further to an eye 130. In some embodiments, the first optical element 101 and the second optical element 102 may be coupled together by an adhesive 103. Each of the first optical element 101 and the second optical element 102 may include one or more optical lenses. For example, in some embodiments, the first optical element 101 may include a lens element 105 and a quarter-wave plate 106. The quarter-wave plate 106 may be attached or coupled to a surface (e.g., a front or back surface) of the lens element 105. In some embodiments, the quarter-wave plate 106 may be a separate film or coating attached to or coated on the surface of the lens element 105. The second optical element 102 may include a lens element 115 and a reflective polarizer 116. The reflective polarizer 116 may be attached or coupled to a surface (e.g., a front or back surface) of the lens element 106. In some embodiments, the reflective polarizer 116 may be a separate film or coating attached to or coated on the surface of the lens element 106. The polarization sensitive optical assembly 100 shown in FIG. 1 is merely for illustrative purposes, in some embodiments, the polarization sensitive optical assembly 100 may include other optical elements, such as a partial reflector, a polarizer, which is not limited by the present disclosure. Further, in the disclosed embodiments, the quarter-wave plate 106 may include a polarization axis, which may be oriented relative to the polarization direction of the incident linearly polarized light to convert the linearly polarized light into a circularly polarized light or vice versa for a visible spectrum and/or infrared spectrum. In some embodiments, for an achromatic design, the quarter-wave plate 106 may include a multilayer birefringent material (e.g., polymer or liquid crystals) to produce quarter wave birefringence across a wide spectral range. In some embodiments, for a simple monochrome design, an angle between the polarization axis (i.e., fast axis) of the quarter-wave plate 106 and incident linearly polarized light may be approximately 45 degrees.

The reflective polarizer 116 may be a partially reflective mirror configured to reflect a received light of a first linear polarization and transmit a received light of a second linear polarization. For example, the reflective polarizer 116 may reflect light polarized in a blocking direction (e.g., x-axis direction), and transmit light polarized in a perpendicular direction (e.g., y-axis direction). In the disclosed embodiments, the blocking direction is referred as a direction of a blocking axis or a blocking axis direction of the reflective polarizer 116, and the perpendicular direction is referred as a direction of a transmission axis or a transmission axis direction of the reflective polarizer 116.

The polarization sensitive optical assembly 100 may be polarization sensitive. For example, the polarization sensitive optical assembly 100 may be sensitive to the polarization alignment between the quarter-wave plate included in the first optical element 101 and the reflective polarizer 116 included in the second optical element 102. That is, the polarization sensitive optical assembly 100 may be sensitive to the alignment between the polarization axis of the quarter-wave plate 106 included in the first optical element 101 and the transmission axis and/or the blocking axis of the reflective polarizer 116 included in the second optical element 102. In some embodiments, the polarization alignment between the first optical element 101 and the second optical element 102 may affect the optical output of the polarization sensitive optical assembly 100. In some embodiments, any deviations in the positions, orientations, and polarization alignment between the first optical element 101 and the second optical element 102 may affect the optical output of the polarization sensitive optical assembly 100. In some embodiments, if the positions, orientations, and polarization alignment do not meet desired (or predetermined) respective specifications, the polarization sensitive optical assembly 100 may not achieve a desired optical property (e.g., a desired optical output). As a result, the polarization sensitive optical assembly 100 assembled from the first optical element 101 and the second optical element 102 may become a defective product, which may be discarded and wasted in conventional assembly systems.

Figure 2:
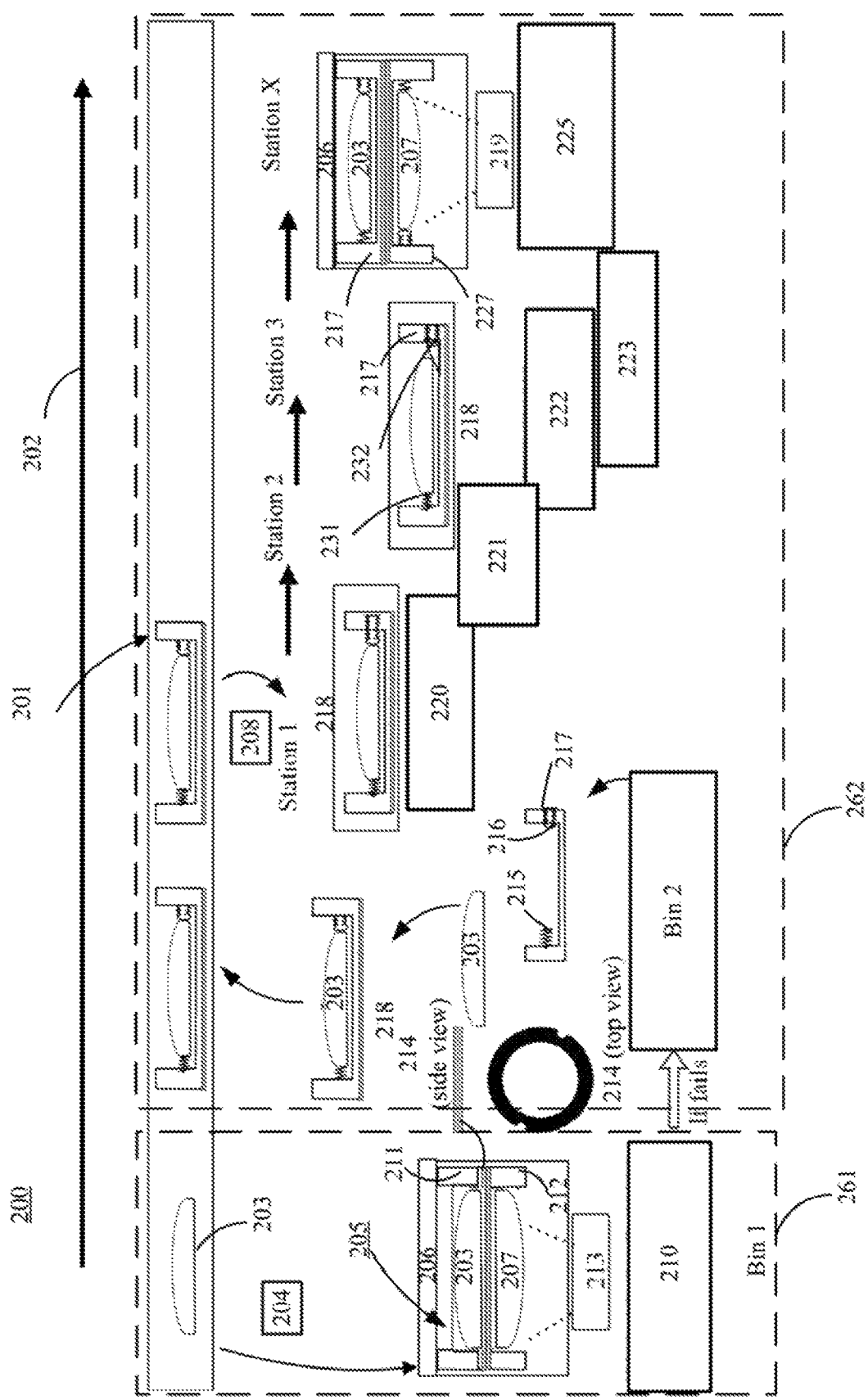
FIG. 2 illustrates a schematic diagram of a fully automated assembling and testing system.

FIG. 2 illustrates an example fully automated assembling and testing system 200 according to an embodiment of the present disclosure. The system 200 may include a full automation assembly line 201. Arrow 202 indicates an example moving direction of the full automation assembly line 201. The full automation assembly line 201 may include a conveyor belt configured to convey or transfer parts from one station to another. A person having ordinary skills in the art would appreciate that the full automation assembly line 201 is a schematic illustration only. Actual implementation of the full automation assembly line 201 may be different. For example, instead of using a conveyance belt for transferring a lens holder from one station to another in the full automation assembly line 201, in some embodiments, robotic arms may move the lens holder from one station to another.

The full automation assembly line 201 may include two assembly and validation lines, referred to as "Bin 1" or 261 and "Bin 2" or 262. In the first assembly and validation line 261 ("Bin 1"), a first lens 203 may be transferred by a robotic arm 204 from the conveyor belt to a first lens holder 211. The first lens holder 211 may have a tightly controlled tolerance. In some embodiments, the first lens 203 may be press-fit into the first lens holder 211. The first lens holder 211 may not include an adjustment mechanism configured to adjust a centering and/or a tilting of the first lens 203. Likewise, a second lens 207 may be transferred by the robotic arm 204 to a second lens holder 212. The second lens holder 212 may have a tightly controlled tolerance. In some embodiments, the second lens 207 may be press-fit into the second lens holder 212. The second lens holder 212 may not include an adjustment mechanism for adjusting the centering and/or the tilting of the second lens 207. At a bottom side of the first lens holder 211, a baffle 214 may be provided and coupled to the first lens holder 211. Likewise, at a bottom side of the second lens holder 212, a baffle 214 may be provided and coupled to the second lens holder 212. The first lens holder 211 may be coupled with the second lens holder 212 (hence the first lens 203 may be coupled with the second lens 207) to form a first optical assembly 205. The first optical assembly 205 may be a pancake lens discussed above, which may be sensitive to error in the positions, orientations, and/or polarization alignment of the first lens 203 and the second lens 207, which may affect the final optical property of the pancake lens. In some embodiments, the first lens holder 211 and the second lens holder 212 may be aligned and coupled through the battles 214 respectively provided at the bottoms of the first lens holder 211 and the second lens holder 212. FIG. 2 shows a top view of the baffle 214 and a side view of the baffle 214. As shown in FIG. 2, the baffle 214 may include alignment indicators (e.g., the opposing notches). A display 206 may be coupled with the first optical assembly 205. For example, the display 206 may be coupled to the first lens holder 211. A quality control test or validation 210 may be performed on the first optical assembly 205 using the display 206 and an image capturing device 213 (e.g., a camera) disposed at another side of the first optical assembly 205 opposite the display 206 (e.g., on the second lens holder 212 side). Image light emitted by the display 206 may travel through the first lens 203 and the second lens 207, and may be captured by the image capturing device 213. The quality control test or validation 210 may test or validate one or more optical properties of the first optical assembly 205, such as an alignment between the first lens 203 and the second lens 207. For example, the image capturing device 213 may be used to check the contrast, ghosting on various patterns produced in the display 206 to validate the alignment.

If the first optical assembly 205 fails the quality control test or validation 210, the first optical assembly 205 may be transferred to the second assembly and validation line 262, indicated by "Bin 2," where the first optical assembly 205 may be disassembled and each individual lens may be tested and adjusted before they are re-assembled to form a second optical assembly. If the first optical assembly 205 passes the quality control test or validation 210, the coupling between the first optical assembly 205 and the display 206 may be secured to form a final optical device.

In the second assembly and validation line 262 ("Bin 2"), the disassembled lens (e.g., first lens 203) may be placed in a first lens holder 217 provided in the second assembly and validation line 262. The first lens holder 217 provided in the second assembly and validation line 262 may include at least one of a centering or a tilting adjustment mechanism configured to adjust at least one of a position (e.g., centering) or an orientation (e.g., tilting) of the first lens 203. In some embodiments, the first lens holder 217 may include both a centering adjustment mechanism and a tilting adjustment mechanism. The centering adjustment mechanism may be configured to adjust a horizontal (or centering) position of a lens (e.g., first lens 203) disposed in the first lens holder 217 such that the lens is located at a center location (e.g., a rotation center) of the first lens holder 217. The centering adjustment mechanism may include a spring 215 and a set screw 216, as shown in FIG. 2. A person having ordinary skills in the art would appreciate that the centering adjustment mechanism may include more than one spring and more than one set screw (e.g., three pairs of spring and screw), or no spring. In some embodiments, the centering adjustment mechanism may include other suitable mechanism other than the spring and/or screw shown in FIG. 2. The tilting adjustment mechanism may be configured to adjust the orientation of the lens (e.g., tilting of the lens). The tilting adjustment mechanism may include a spring 231 and a screw 232 having a wedge-shaped head. A person having ordinary skills in the art would appreciate that the spring 232 and the screw 232 are only examples of the tilting adjustment mechanism. Any other suitable tilting adjustment mechanism may be used. In some embodiments, the centering adjustment mechanism and the tilting adjustment mechanism may not include a spring.

The baffle 214 may be coupled to a bottom of the first lens holder 217 to form a lens cell 218. The lens cell 218 may be placed onto a conveyor belt of the full automation assembly line 201, which may convey or transfer the lens cell 218 to a plurality of stations for processing. A person having ordinary skills in the art would appreciate that the system 200 may include one or more robotic arms to transfer the lens cell 218 to different stations, rather than using a conveyor belt. Other methods or systems for transferring the lens cells 218 to different stations may also be used.

Although FIG. 2 only shows the processing of the first lens 203 in the second assembly and validation line 262 ("Bin 2"), it is understood that the second lens 207 may be processed similarly. For example, the second lens 207 may be disassembled from the second lens holder 212 of the first optical assembly 205. The second lens 207 may be placed into a second lens holder 227 provided in the second assembly and validation line 262. The second lens holder 227 may be different from the second lens holder 212 provided in the first assembly and validation line 261. The second lens holder 227 may be structurally similar to the first lens holder 217, which may include at least one of a centering or a tilting adjustment mechanism (e.g., both a centering mechanism and a tilting adjustment mechanism) configured to adjust a position (e.g., centering) and/or an orientation (e.g., tilting) of the second lens 207. A baffle 214 may be coupled to a bottom of the second lens holder 227 to form a lens cell similar to the lens cell 218. Similar to the lens cell 218, the lens cell formed by the second lens 207 and the second lens holder 227 may be transferred to different stations for processing using a conveyor belt or a robotic arm included in the system 200. In other words, the first lens 203 and the second lens 207 may be separately placed in a lens holder, and may be separately processed in various stations. At the various stations of the second assembly and validation line, a position (e.g., centering position) and/or orientation (e.g., tilting) of the first lens 203 and the second lens 207 in the respective lens holder may be measured. If the position and/or orientation are not at the desired position and/or orientation (e.g., based on a measured optical property), the position and/or orientation of each individual lens may be adjusted using the centering mechanism and/or the tilting mechanism. In addition, the polarization effect of the individual lens may be separately adjusted to achieve a desired polarization effect.

As shown in FIG. 2, the first lens cell 218 (including the first lens 203) may be processed at various stations. At Station 1 and Station 2, an optical center measurement may be performed. The optical center measurement may include at least one of a centering measurement or a tilting measurement. The centering measurement measures whether the lens is located at a center location with respect to the lens holder. The tilting measurement measures whether the lens is horizontal (or is tilted) with respect to a testing light incident on the lens. If the optical center measurement does not satisfy a predetermined optical center condition, an optical center adjustment may be performed. The predetermined optical center condition may include at least one of a predetermined centering condition or a predetermined tilting condition. The optical center adjustment may include at least one of a centering adjustment or a tilting adjustment.

At Station 3 and Station 4, a polarimetric measurement or a polarization validation may be performed. The polarimetric measurement may indicate a polarization effect of the lens, i.e., a polarization state of the light transmitted through the lens given an incident light with a specific polarization state. If the polarimetric measurement does not satisfy a predetermined polarimetric condition, a polarimetric angle adjustment may be performed on the lens. Depending on the type of optical element included in the lens that may affect the polarization effect of the lens, different polarimetric measurements and polarimetric angle adjustments may be performed. For example, if the lens includes a quarter-wave plate that may affect the polarization effect of the lens, the polarimetric measurement may include a measurement relating to a polarization effect of the quarter-wave plate. Performing the polarimetric angle adjustment may include performing a quarter-wave plate angle adjustment when the measurement does not satisfy a predetermined condition relating to the polarization effect of the quarter-wave plate. In particular, performing the quarter-wave plate angle adjustment may include rotating the lens including the quarter-wave plate to produce a desired polarization effect, i.e., a desired polarization state of the light transmitted through the lens given a specifically polarized incident light. For example, the polarization axis of the quarter-wave plate may be oriented relative to the polarization direction of the incident linearly polarized light to convert the linearly polarized light into circularly polarized light or vice versa. If the lens includes a reflective polarizer, the polarimetric measurement may include a measurement relating to a polarization effect of the reflective polarizer. Performing the polarimetric angle adjustment may include performing a reflective polarizer angle adjustment when the measurement does not satisfy a predetermined condition relating to the polarization effect of the reflective polarizer. In particular, performing the reflective polarizer angle adjustment may include rotating the lens including the reflective polarizer to produce a desired polarization effect, i.e., a desired polarization state of the light transmitted through the lens given a specifically polarized incident light. For example, the transmission axis (or blocking axis) of the reflective polarizer may be oriented relative to the polarization direction of the incident linearly polarized light to completely transmit (or block) the incident linearly polarized light. In some embodiments, Station 3 and Station 4 may be two separate stations along the second assembly and validation line 262, each processing a lens holder (e.g., Station 3 processing the first lens holder 217 with the first lens 203 and Station 4 processing the second lens holder 227 with the second lens 207). In some embodiments, Station 3 and Station 4 may be the same station for processing the first lens holder 217 (hence the first lens 203) and the second lens holder 227 (hence the second lens 207). When one lens holder is processed, that lens holder may be moved out of the station such that another lens holder may be moved in and processed at the station.

Referring to FIG. 2, the first lens 203 may be processed at Station 1 for measuring and/or adjusting the position (e.g., centering) of the first lens 203. For example, at Station 1, a centering measurement of the first lens 203 indicating whether the first lens 203 is disposed at a center location in the first lens holder 217 may be performed. If the centering measurement does not satisfy a predetermined centering condition, a centering adjustment (also referred to as a decentering correction) may be performed on the first lens 203 using the centering adjustment mechanism provided in the first lens holder 217 until the centering measurement satisfies the predetermined centering condition. For example, the centering of the first lens 203 may be adjusted by adjusting the screw 216. If the centering measurement initially performed satisfies the predetermined centering condition, no centering adjustment will be performed. It is understood that a similar process may be performed on the second lens 207.

After the centering measurement and adjustment (if needed) are performed, the lens cell 218 may be transferred to a Station 2. At Station 2, a tilting measurement for the first lens 203 may be performed. When the tilting measurement satisfies a predetermined tilting condition, no tilting adjustment will be performed. When the tilting measurement does not satisfy the predetermined tilting condition, a tilting adjustment (also referred to as a tilting correction) may be performed on the first lens 203 using the tilting adjustment mechanism provided on the first lens holder 217. For example, the tilting adjustment may be performed by adjusting the screw 232 having a wedge-shaped head to change the tilting of the first lens 203. It is understood that a similar process may be performed on the second lens 207.

It is understood that in some embodiments, the centering measurement and adjustment may be performed after the tilting measurement and adjustment are performed. In some embodiments, at least one of the first lens holder 217 or the second lens holder 227 may not include a centering adjustment mechanism. For example, the first lens holder 217 may not include a centering adjustment mechanism. The centering location of the first lens 203 may serve as the reference for the second lens 207, and centering of the second lens 207 may be adjusted to match that of the first lens 203. Likewise, in some embodiments, the second lens holder 227 may not include a centering adjustment mechanism. The centering location of the second lens 207 may serve as the reference for the first lens 203, and the centering of the first lens 203 may be adjusted to match that of the second lens 207. In some embodiments, at least one of the first lens holder 217 or the second lens holder 227 may not include a tilting adjustment mechanism. For example, the first lens holder 227 may not include a tilting adjustment mechanism, and the orientation (e.g., tilting angle) of the first lens 203 may serve as a reference. The second lens 207 may be adjusted for its tilting to match that of the first lens 203 (e.g., such that the second lens 207 is substantially parallel with the first lens 203). Likewise, in some embodiments, the second lens holder 227 may not include a tilting mechanism. The orientation (e.g., tilting angle) of the second lens 207 may serve as a reference for the first lens 203. The tilting of the first lens 203 may be adjusted to match that of the second lens 207 (e.g., such that the first lens 203 is substantially parallel with the second lens 207).

In some embodiments, the first lens holder 217 and the second lens holder 227 may each include both the centering adjustment mechanism and the tilting adjustment mechanism. However, at Station 1 and Station 2, not every lens (first lens 203 and second lens 207) is adjusted for its centering or tilting. In other words, centering measurement and adjustment or tilting measurement and adjustment may be omitted for the first lens 203 or the second lens 207, for example, for reasons discussed above relating to the first lens 203 or the second lens 207 being a reference for the other one.

In some embodiments, after the centering and/or tilting measurement and adjustment are performed, the lens cell 218 may be transferred to a Station 3. For illustrative purposes, it is assumed that the first lens 203 includes a quarter-wave plate that may affect the polarization effect of the first lens 203, and the second lens 207 includes a reflective polarizer that may affect the polarization effect of the second lens 207. At Station 3, a measurement relating to a polarization effect of a quarter-wave plate included in the first lens 203 may be performed. If the measurement satisfies a predetermined condition relating to the polarization effect of the quarter-wave plate, no polarimetric angle adjustment will be performed. If the measurement does not satisfy a predetermined condition relating to the polarization effect of the quarter-wave plate, a polarimetric angle adjustment may be performed for the first lens 203. The polarimetric angle of the quarter-wave plate may be adjusted until the measurement relating to the polarization effect of the quarter-wave plate satisfies the predetermined condition relating to the polarization effect of the quarter-wave plate.

The lens cell formed by the second lens 207 and the second lens holder 227 may be transferred to a Station 4 after the centering and/or tilting measurement and adjustment are performed. At Station 4, a measurement relating to a polarization effect of the reflective polarizer included in second lens 207 is performed. If the measurement satisfies a predetermined condition relating to the polarization effect of the reflective polarizer, no polarimetric angle adjustment will be performed. If the measurement does not satisfy the predetermined condition relating to the polarization effect of the reflective polarizer, a reflective polarizer angle adjustment may be performed for the second lens 207 until the measurement satisfies the predetermined condition relating to the polarization effect of the reflective polarizer. It is understood that the lens cell formed by the second lens 207 and the second lens holder 227 may not be transferred to Station 3 before being transferred to Station 4. Rather, the lens cell may be directly transferred from Station 1 or Station 2.

Both the lens cell formed by the first lens 203 and the first lens holder 217 and the lens cell formed by the second lens 207 and the second lens holder 227 may be transferred to a Station 5, where they are assembled together (hence the first lens 203 and the second lens 207 are assembled) to form a second optical assembly. For example, the first lens holder 217 and the second lens holder 227 may be aligned and coupled together using the baffle 214 attached to the bottoms of the first lens holder 217 and the second lens holder 227. The display 206 may be coupled with the second optical assembly. A quality control test or validation 225, which may be similar to the quality control test or validation 210 performed at Bin 1 may be performed to validate the alignment (e.g., polarization alignment, optical axis alignment) between the first lens 203 and the second lens 207. The quality control test or validation 225 may be performed using the display 206 and an image capturing device 219, such as a camera 219. If the second optical assembly passes the quality control test or validation 225, the coupling between the display 206 and the second optical assembly may be secured to form an optical device. For example, the first lens holder 227 and the second lens holder 227 may be glued together using an ultraviolet ("UV") cured glue, or may be coupled together using any other methods, such as screws, clamps, etc. If the second optical assembly does not pass the quality control test or validation 225, fine-tuning or adjustment of the alignment between the first lens 203 and the second lens 207 may be performed until the second optical assembly passes the quality control test or validation 225.

Figure 3:
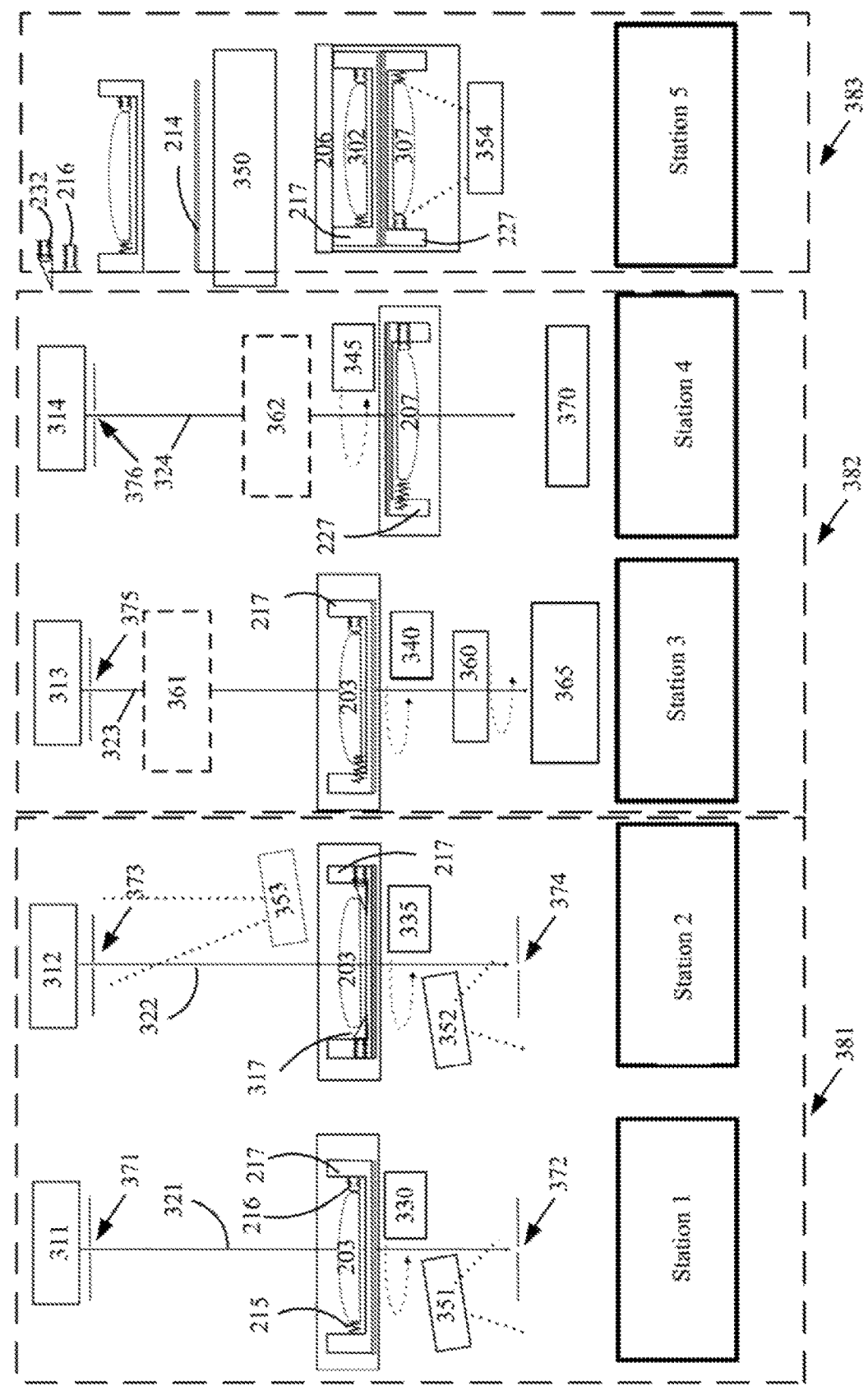
FIG. 3 illustrates a plurality of sub-systems included in the fully automated assembling and testing system of FIG. 2.

FIG. 3 illustrates a plurality of sub-systems included in the fully automated assembling and testing system 200. Specifically, the sub-systems are included in the second assembly and validation line 262 shown in FIG. 2. Various stations are shown in FIG. 2 and described above briefly. FIG. 3 shows additional details of the various stations.

As shown in FIG. 3, the second assembly and validation line 262 may include a first sub-system 381, a second sub-system 382, and a third sub-system 383. The first sub-system 381 may be configured to perform an optical center measurement for at least one of the first lens or the second lens, and perform an optical center adjustment when the optical center measurement does not satisfy a predetermined optical center condition. As discussed above, the optical center measurement may include a centering measurement and a tilting measurement. The optical center adjustment may include a centering adjustment and a tilting adjustment. The predetermined optical center condition may include a predetermined centering condition and a predetermined tilting condition. Correspondingly, the first sub-system 381 may include Station 1 configured to perform the centering measurement and the centering adjustment, and Station 2 configured to perform the tilting measurement and the tilting adjustment.

The first sub-system 381 may include at least one of a laser emitter and an image capturing device. For example, as shown in FIG. 3, Station 1 may include a laser emitter 311 and an image capturing device 351 (e.g., camera). Station 2 may include a laser emitter 312 and a first image capturing device 352 (e.g., camera) and a second image capturing device 353 (e.g., camera). Station 1 may also include a first iris 371 and a second iris 372. Likewise, Station 2 may include a first iris 373 and a second iris 374.

At Station 1, a centering measurement and/or a centering adjustment may be performed for a lens, such as the first lens 302 and the second lens 307, respectively. For illustrative purposes, only the first lens 302 is shown at Station 1 and Station 2. It is understood that similar processes performed at Stations 1 and 2 for the first lens 302 may be performed on the second lens 307.

Station 1 may include a rotation stage 330 configured to hold and rotate a lens holder containing a lens (e.g., the first lens holder 217 containing the first lens 203). When performing a centering measurement and centering adjustment, the lens may be rotated as the centering measurement and/or adjustment are performed. The laser emitter 311 may emit a laser beam 321. The laser beam 321 may pass through the first iris 371 and pass through the second iris 372 when there is no optical element on the optical path of the laser beam 321. When the first lens holder 217 with the first lens 203 disposed therein is placed between the first iris 371 and the second iris 372, the optical path of the laser beam 321 may be altered or affected by the first lens 203. A portion of the laser beam 321 transmitted through the first lens 203 may arrive at the second iris 372. When the first lens 203 is not at the center position (e.g., when the optical axis of the first lens 203 is not parallel with the laser beam 321), the portion of the laser beam 321 transmitted through the first lens 203 may deviate from the original laser beam. In other words, the portion of the laser beam 321 transmitted through the first lens 203 may deviate from the second iris 372.

The image capturing device 351 may capture images of the laser beam 321 and the second iris 372 as the rotation stage 330 rotates 360°, causing the first lens 203 to rotate 360°. The images captured as the first lens 203 is rotated from 0 to 360° may indicate whether the laser beam 321 wobbles around the second iris 372 or whether the laser beam 321 propagates through the second iris 372 all the time as the first lens 203 is rotated. A person having ordinary skills in the art would appreciate that in some embodiments, the rotation stage 330 may not need to rotate 360°, but rather may only rotate from 0 to a suitable angle less than 360° (e.g., 180°, 250°, etc.). Capturing the images may be an embodiment of performing a centering measurement. The images captured by the image capturing device 351 may be processed by a processor (not shown) to determine whether the first lens 203 is at the center position. For example, the processor may analyze the images and determine whether the laser beam 321 propagates or travels through the second iris 372, or whether the laser beam 321 wobbles around the iris 372. An embodiment of a predetermined centering condition may be the laser beam 321 traveling through the second iris 372. When the image indicates that the laser beam 321 travels through the second iris 372, it means that the centering measurement satisfies the predetermined centering condition. When the image indicates that the laser beam 321 wobbles around the second iris 372, it means that the centering measurement does not satisfy the predetermined centering condition.

Based on a determination that the laser beam 321 does not travel through the second iris 372 (i.e., wobbles around the second iris 372), the processor may provide a command to an automated tool (not shown) to instruct the automated tool to adjust the centering mechanism. When the centering mechanism includes a screw configured to adjust the centering position of the first lens 203, the automated tool may include a corresponding screw adjusting tool (e.g., a screw driver). The command may instruct the automated tool to adjust the centering mechanism (e.g., the screw 216) for a certain amount to correct the centering position of the first lens 203. After the centering mechanism is adjusted or while the centering mechanism is adjusted, images of the laser beam 321 and the second iris 372 may be captured by the image capturing device 351, and analyzed by the processor to determine whether the adjustment of the centering mechanism has placed the first lens 203 at a center position (e.g., by determining whether the laser beam 321 travels through the second iris 372 rather than wobbles around the second iris 372).

Thus, in some embodiments, a closed-loop feedback system may be formed by the processor, the image capturing device 351, and the automated tool configured to adjust the centering mechanism. The image information captured by the image capturing device 351 may be used to generate a feedback to control the automated tool to adjust the centering mechanism. The control and the adjustment may be automatically performed until the image captured by the image capturing device 351 indicates that the portion of the laser beam 321 transmitted through the first lens 203 does not wobble around the second iris 372, but instead, travels through the second iris 372. At this state, the processor may determine that the first lens 203 is at a center position (i.e., the centering measurement satisfies the predetermined centering condition).

In some embodiments, after the centering measurement and adjustment are performed on the first lens 203, the first lens 203 may be transferred to Station 2. It is understood that in some embodiments, the first lens 203 (or the second lens 207) may not need go through Station 1 or Station 2. At Station 2, a tilting measurement and/or adjustment may be performed on the first lens 203. Station 2 may include a laser emitter 312 configured to emit a laser beam 322. Station 2 may include a first iris 373 and a second iris 374. The laser beam 322 may travel through the first iris 373 and the second iris 374 when there is no other optical element disposed between the first iris 373 and the second iris 374 (e.g., when the first lens 203 is not located between the first iris 373 and the second iris 374). Station 2 may include a first image capturing device 352 and a second image capturing device 353. The first image capturing device 352 and the second image capturing device 353 may be cameras. The first image capturing device 352 may be configured to capture images of a portion of the laser beam 322 transmitted through the first lens 203 and the second iris 374, which may indicate the relative positions of the portion of the laser beam 322 and the second iris 374 (e.g., whether the portion of the laser beam 322 travels through the second iris 374 or whether the portion of the laser beam 322 wobbles around the second iris 374). The second image capturing device 353 may be configured to capture images of a portion of the laser beam 322 reflected by the first lens 203 and the first iris 373, which may indicate the relative positions of the portion of the laser beam 322 reflected by the first lens 203 and the first iris 373 (e.g., whether the reflected laser beam travels through the first iris 373 or whether the reflected laser beam wobbles around the first iris 373).

Station 2 may also include a rotation stage 335 configured to hold and rotate the first lens holder 217 to cause the first lens 203 to rotate. The first lens holder 217 may include a tilting adjustment mechanism. The tilting adjustment mechanism may include at least one screw 317 having a wedge-shaped head. FIG. 3 shows the tilting adjustment mechanism having two screws 317 having a wedge-shaped head. A person having ordinary skills in the art would appreciate that the schematic illustration of the first lens holder 217 is only one embodiment. In some embodiments, as shown in FIG. 2, the first lens holder 217 may include at least one spring (which may be similar to spring 231). In some embodiments, other suitable tilting adjustment mechanism may be included in the first lens holder 217.

A tilting measurement may be performed at Station 2. In some embodiments, the tilting measurement may be performed by the second image capturing device 353. The second image capturing device 353 may capture images of the portion of the laser beam 322 reflected by the first lens 203 back to the first iris 373, and the first iris 373. When the reflected portion of the laser beam 322 travels through the first iris 373, or when the reflected portion of the laser beam 322 wobbles within a predetermined range around the first iris 373, as the first lens 203 is rotated 360° by the rotation stage 335, the processor may determine that the tilting measurement satisfies a predetermined tilting condition. A person having ordinary skills in the art would appreciate that in some embodiments, the rotation stage 335 may not need to rotate 360°, but rather may only rotate from 0° to a suitable angle less than 360°. The predetermined tilting condition may be that the reflected portion of the laser beam 322 wobbles within a predetermined range around the first iris 373. The predetermined range may be any suitable range determined based on a desired specification. For example, the predetermined range may be 1 mm laser beam diameter at 0.5 meter away from the first lens 203 (or approximately 2 milliradian ("mrad"), or 0.11°). Thus, in some embodiments, when the reflected portion of the laser beam 322 wobbles within approximately 1 mm laser beam diameter at 0.5 m away from the first lens 203, the predetermined tilting condition is deemed satisfied, and no further tilting correction will be performed. If the tilting measurement indicates that the reflected portion of the laser beam 322 wobbles outside of the predetermined range (e.g., greater than 1 mm laser beam diameter at 0.5 m away from the first lens 203), the processor may determine that tilting correction or adjustment needs to be performed on the first lens 203. The processor may determine an amount of tilting adjustment needed and may provide a feedback control signal to an automated tool (not shown) configured to adjust the tilting adjustment mechanism. The tilting adjustment and measurement may be repeated until the tilting measurement satisfies the predetermined tilting condition. It is understood that similar processes may be performed on the second lens 207 separately.

After the tilting measurement and adjustment are performed, a lens may be transferred to Station 3 or Station 4, where a polarimetric measurement and/or a polarimetric angle adjustment may be performed on the lens. The polarimetric angle adjustment may be performed on the lens when the polarimetric measurement does not satisfy a predetermined polarimetric condition. For example, for the first lens 203, after the tilting measurement and adjustment are performed, the first lens 203 may be transferred to Station 3, where a measurement relating to a polarization effect of a quarter-wave plate included in the first lens 203 may be performed. The processor may determine whether the measurement satisfies a predetermined condition relating to the polarization effect of the quarter-wave plate. If the measurement satisfies the predetermined condition relating to the polarization effect of the quarter-wave plate, no polarimetric angle adjustment will be performed. If the measurement does not satisfy the predetermined condition relating to the polarization effect of the quarter-wave plate, a polarimetric angle adjustment (e.g., a quarter-wave plate angle adjustment) may be performed for the first lens 203.

Station 3 may include a laser emitter 313 configured to emit a laser beam 323. Station 3 may also include an iris 375. The laser beam 323 emitted by the laser emitter 313 may travel through the iris 375. Optionally, in some embodiments, Station 3 may include a linear polarizer 361 configured to linearly polarize the emitted laser beam 323 such that the laser beam 323 output from the polarizer 361 may be configured to have a specific polarization direction, i.e., a polarization direction along the transmission axis of the linear polarizer 361. Station 3 may include a rotation stage 340 configured to hold and rotate the first lens holder 217 (and hence to rotate the first lens 203). Station 3 may include an analyzer 360, which may be disposed after the first lens 203 (i.e., downstream of the first lens 203 in the optical path of the laser beam 323). The analyzer 360 may be a linear polarizer having a transmission axis and a blocking axis perpendicular to the transmission axis. The analyzer 360 may be configured to transmit a light having a polarization direction parallel with the transmission axis, and block a light having a polarization direction perpendicular to the transmission axis (e.g., parallel with the blocking axis). Station 3 may further include a power meter 365 configured to measure an intensity or transmitted power of the laser beam 323 transmitted through the first lens 203 and the analyzer 360.

The polarimetric measurement for the first lens 203 including a quarter-wave plate (or a measurement relating to the polarization effect of the quarter-wave plate) may be conducted as follows. The rotation stage 340 may be rotated to a first angle (hence the first lens 203 or the quarter-wave plate included in the first lens 203 is at the first angle) with respect to the transmission axis of the linear polarizer 361. The angle may also be referred to as a quarter-wave plate angle. While the first lens is at the first angle, the analyzer 360 may be rotated 360°, and the intensities or transmitted powers of the portion of the laser beam 323 transmitted through the first lens 203 and the analyzer 360 may be measured by the power meter 365 at each angle of the analyzer 360. A person having ordinary skills in the art would appreciate that in some embodiments, the analyzer 360 may not need to rotate 360°, but rather may only rotate from 0° to a suitable angle less than 360°. The intensities or transmitted powers corresponding to the different angles of the analyzer 360 may be recorded. The intensities or transmitted powers measurement may be an embodiment of the measurement relating to a polarization effect of the quarter-wave plate included in the first lens 203. The processor may analyze the intensities or transmitted powers to determine whether the intensities or transmitted powers are constant or nearly constant at different analyzer angles. The measured intensities or transmitted powers being constant or nearly constant may be an example of the predetermined condition relating to the polarization effect of the quarter-wave plate. Various data analysis methods may be used to determine whether the intensities are constant or nearly constant. For example, if a ratio between a maximum intensity and a minimum intensity is smaller than a predetermined value, the intensities may be determined to be constant or nearly constant. As another example, the standard deviation of the measured intensities or transmitted powers may be calculated. If the standard deviation is smaller than a predetermined value, the intensities or the transmitted powers may be determined to be constant or nearly constant.

Other suitable methods may also be used to verify the polarization state of the first lens 203. For example, an off-the-shelf polarimeter may be used to determine the polarization state of the quarter-wave plate included in the first lens 203.

The rotation stage 340 may continue to rotate the first lens 203 to a second angle, and similar measurement of the intensities or transmitted powers may be obtained and analyzed as the analyzer 360 rotates 360°. This process may be repeated until the rotation stage 340 has rotated 360°. A person having ordinary skills in the art would appreciate that in some embodiments, the rotation stage 340 may not need to rotate 360°, but rather may only rotate from 0° to a suitable angle less than 360°. When the first lens 203 is at a certain angle, a portion of the laser beam 323 entering the first lens 203 may be converted into a circularly polarized laser beam by the first lens 203. The circularly polarized laser beam output from the first lens 203, after traveling through the analyzer 360, may become a laser beam having a constant intensity or transmitted power regardless of the angle of the analyzer 360. Thus, the measured intensities may be constant or nearly constant when the first lens 203 generates a circularly polarized laser beam. When the laser beam output from the first lens 203 is not a circularly polarized beam, the intensities measured by the power meter 365 may not be constant and may oscillate in a sine or cosine wave shape. For example, the ratio between the maximum intensity and the minimum intensity may be greater than a predetermined value, or the standard deviation of the intensities corresponding to different analyzer angles may be greater than a predetermined value. The angle of the first lens 203 at which a circularly polarized beam is generated by the first lens 203 may be recorded. A baffle (which may be similar to baffle 214) may be securely coupled to the first lens holder 217 to lock the angle of the first lens 203 (also referred as a clocking angle of the first lens 203).

After the centering and/or tilting measurement and adjustment are performed on the second lens 207 having a reflective polarizer, the second lens 207 may be transferred to Station 4. At Station 4, a measurement relating to a polarization effect of a reflective polarizer included in the second lens 207 may be performed. Station 4 may include a laser emitter 314 configured to emit a laser beam 324. Station 4 may include an iris 376. The laser beam 324 emitted by the laser emitter 314 may travel through the iris 376. Station 4 may include a polarizer 362 disposed upstream (in the optical path of the laser beam 324) of a rotation stage 345 holding and rotating the second lens holder 227 that contains the second lens 207. The polarizer may be optional. Station 4 may include a power meter 370, which may be similar to the power meter 365.

The polarimetric measurement and polarimetric angle adjustment performed at Station 4 may be similar to those performed in Station 3. At Station 4, the polarimetric measurement may be the measurement relating to a polarization effect of a reflective polarizer included in the second lens 207. Specifically, in some embodiments, the rotation stage 345 may be rotated to a first angle (hence the second lens 207 is at the first angle) with respect to the transmission axis of the polarizer 362. The angle of the second lens 207 may also be referred to as a reflective polarizer angle. At each lens angle, the intensity or transmitted power of the portion of the laser beam 324 transmitted through the second lens 207 (which includes a reflective polarizer) may be measured by the power meter 370. The second lens 207 may be rotated to a second angle, and the intensity or transmitted power may be recorded again. The process may be repeated until the rotation stage 345 has rotated 360°. It is understood that the rotation stage 345 may not need to rotate 360°. In some embodiments, the rotation stage 345 may only rotate to an angle less than 360°, such as 180°, 200°, 250°, etc. The measurement of the intensities may be an example of the measurement relating to a polarization effect of the reflective polarizer included in the second lens 207. The processor may determine whether the measurement satisfies a predetermined condition relating to the polarization effect of the reflective polarizer. In some embodiments, the transmission axis of the reflective polarizer may be orientated relative to the polarization axis of the linearly polarized light incident onto the second lens 207 (which includes a reflective polarizer), where the predetermined condition relating to the polarization effect of the reflective polarizer may include, for example, a minimum transmission power among the transmission powers measured as the second lens 207 is rotated within a range of angles. The minimum transmission power may be determined and the corresponding angle of the second lens 207 may be recorded. A baffle 214 may be securely coupled (e.g., glued) to the bottom portion of the second lens holder 227 to lock the reflective polarizer angle of the second lens 207.

After the first lens 203 is processed at Station 3 and the second lens 207 is processed at Station 4, the first lens holder 217 and the second lens holder 227 may be transferred to Station 5. At Station 5, the first lens holder 217 and the second lens holder 227 may be aligned and coupled together to form an optical assembly, thereby achieving a desired polarization effect of the formed optical assembly. In particular, each of the first lens holder 217 and the second lens holder 227 may include a baffle 214 attached to the bottom portion. The baffles 214 may be used to align the first lens holder 217 and the second lens holder 227 using the notches provided on the baffles 214. Reference number 350 indicates a rotation stage. It is understood that Station 5 may include two rotation stages 350, each holding a lens holder. Rotation stage 350 may include vacuum tubings to hold the baffle 214 provided at the bottom of the lens holder through vacuum forces. With the rotation stages 350 holding the lens holders (e.g., first lens holder 217 and second lens holder 227), the first lens 203 and the second lens 207 may be translated toward one another. In some embodiments, the first lens holder 217 may be coupled with the second lens holder 227 and aligned with the second lens holder 227 using the baffles 214. The first lens holder 217 and the second lens holder 227 may form a second optical assembly. In some embodiments, the light incident onto the second optical assembly may be circularly polarized light, and the first lens holder 217 may be aligned with the second lens holder 227 to not only fold the optical path but also convert the circularly polarized light into a linearly polarized light. In some embodiments, the light incident onto the second optical assembly may be linearly polarized light with a first polarization direction, and the first lens holder 217 may be aligned with the second lens holder 227 to not only fold the optical path but also convert the linearly polarized light with the first polarization direction into a linearly polarized light with a second polarization direction perpendicular to the first polarization direction.

Further, the display 206 may be coupled to the second optical assembly. A quality control test or validation similar to that performed at Bin 1 may be performed on the second optical assembly. For example, the display 206 and an image capturing device 354 (e.g., camera) may be used to validate the alignment of the first lens 203 and the second lens 207. Various methods may be used to validate the alignment. For example, the processor may examine the contrast and/or ghosting features of images of various patterns generated by the display 206, as captured by the image capturing device 354. Fine-tuning of the alignment of the first lens 203 and the second lens 207 may be performed until a desired alignment is achieved. For example, in some embodiments, the fine-tuning of the alignment may be performed until the see-through ghost effect is minimized. When the alignment is confirmed, the first lens holder 217 may be securely coupled with the second lens holder 227. The first lens holder 217 may be disengaged from the rotation stage 350. The display 206 may be securely coupled with the first lens holder 217 or the second lens holder 227. The second lens holder 227 may be disengaged from the rotation stage 350. The final optical device may include the display 206, the first lens 203 (held by at least a portion of the first lens holder 217), and the second lens 207 (held by at least a portion of the second lens holder 227). In some embodiments, after the first lens holder 217 and the second lens holder 227 are coupled together, a portion of the first lens holder 217 may be removed.

Figure 4:
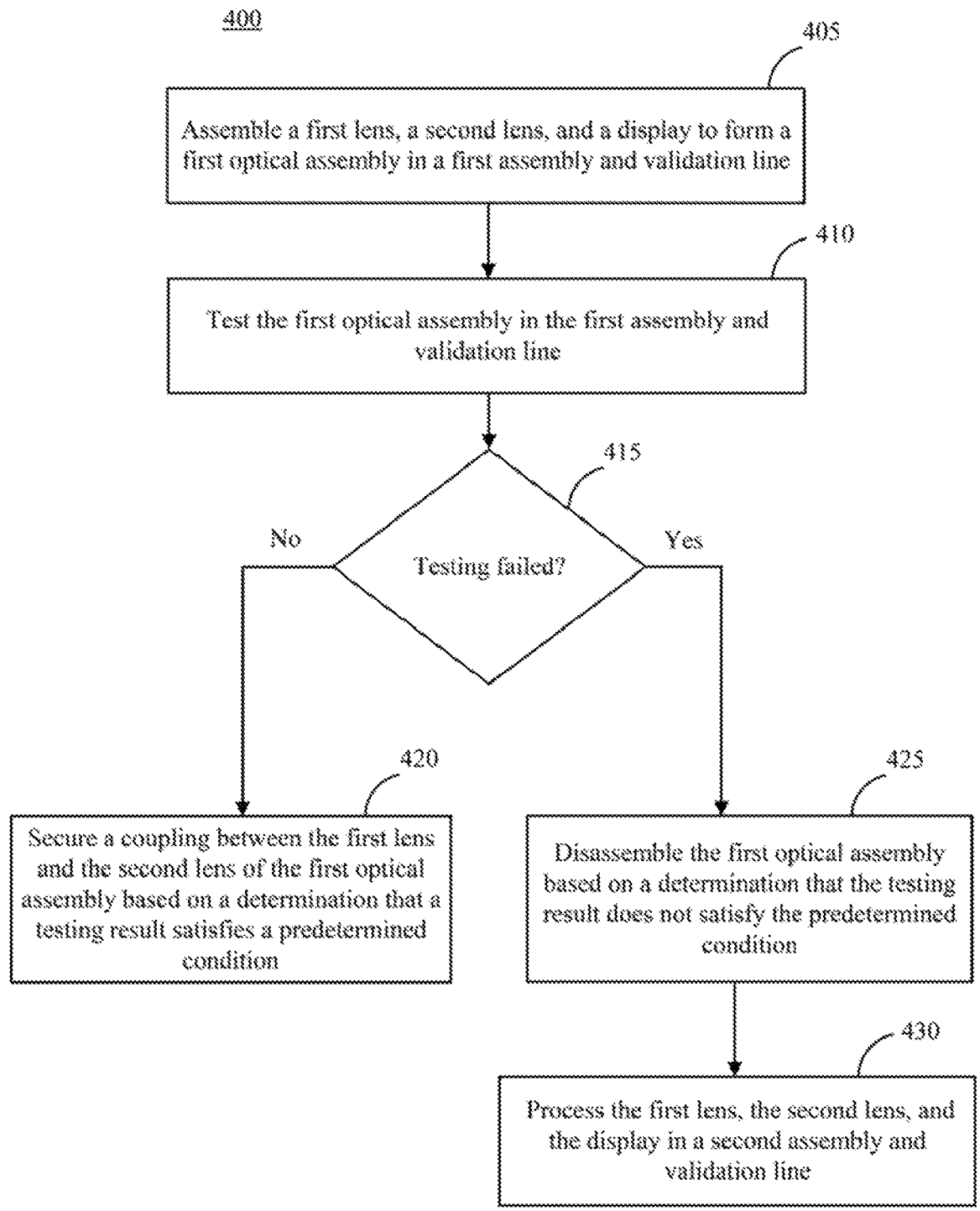
FIG. 4 is a flow chart illustrating a method for assembling and testing a plurality of lens.

FIG. 4 is a flow chart illustrating a method 400 for assembling and testing a plurality of lenses, such as the first lens 203 and the second lens 207. Method 400 may be performed by the system 200. A person having ordinary skills in the art would appreciate that method 400 may include more or fewer steps than those shown in FIG. 4. In addition, the order of execution of the steps may be different from that shown in FIG. 4. Method 400 may include assembling a first lens, a second lens, and a display to form a first optical assembly in a first assembly and validation line (step 405). For example, as shown in "Bin 1" in FIG. 2, the first lens 203 and the second lens 207 may be disposed into a respective lens holder. The two lens holders may be coupled together to form a first optical assembly. Method 400 may also include testing the first optical assembly in the first assembly and validation line (step 410). For example, a quality control test or validation may be performed on the first optical assembly using the display 206 and the image capturing device 213. The quality control test or validation may include examining the contrast and/or the ghosting effects of various patterns generated on the display 206, using the image capturing device 213.

Method 400 may include determining whether the first optical assembly fails the test (step 415). If the first optical assembly passes the test (e.g., the quality control test or validation), i.e., if the testing result satisfies a predetermined condition, the coupling between the first lens 203 and the second lens 207, and optionally the coupling between the display 206 and the first optical assembly, may be secured. In some embodiments an ultraviolet curable glue may be applied to secure the coupling between the first lens 203, the second lens 207, and/or the display 206. The predetermined condition may be any suitable conditions. In some embodiments, the predetermined condition may be a predetermined minimum amount of ghosting effect, or a predetermined contrast value. If the testing result does not satisfy the predetermined condition, the first optical assembly may be disassembled into individual elements (e.g., first lens 203 and second lens 207) (step 415). The disassembled lenses 203 and 207 may be transferred to a second assembly and validation line ("Bin 2"). The first lens 203, the second lens 207, and the display 206 may be processed in the second assembly and validation line (step 430). In some embodiments, step 425 may be part of step 430. That is, the first optical assembly may be disassembled in the second assembly and validation line.

Figure 5:
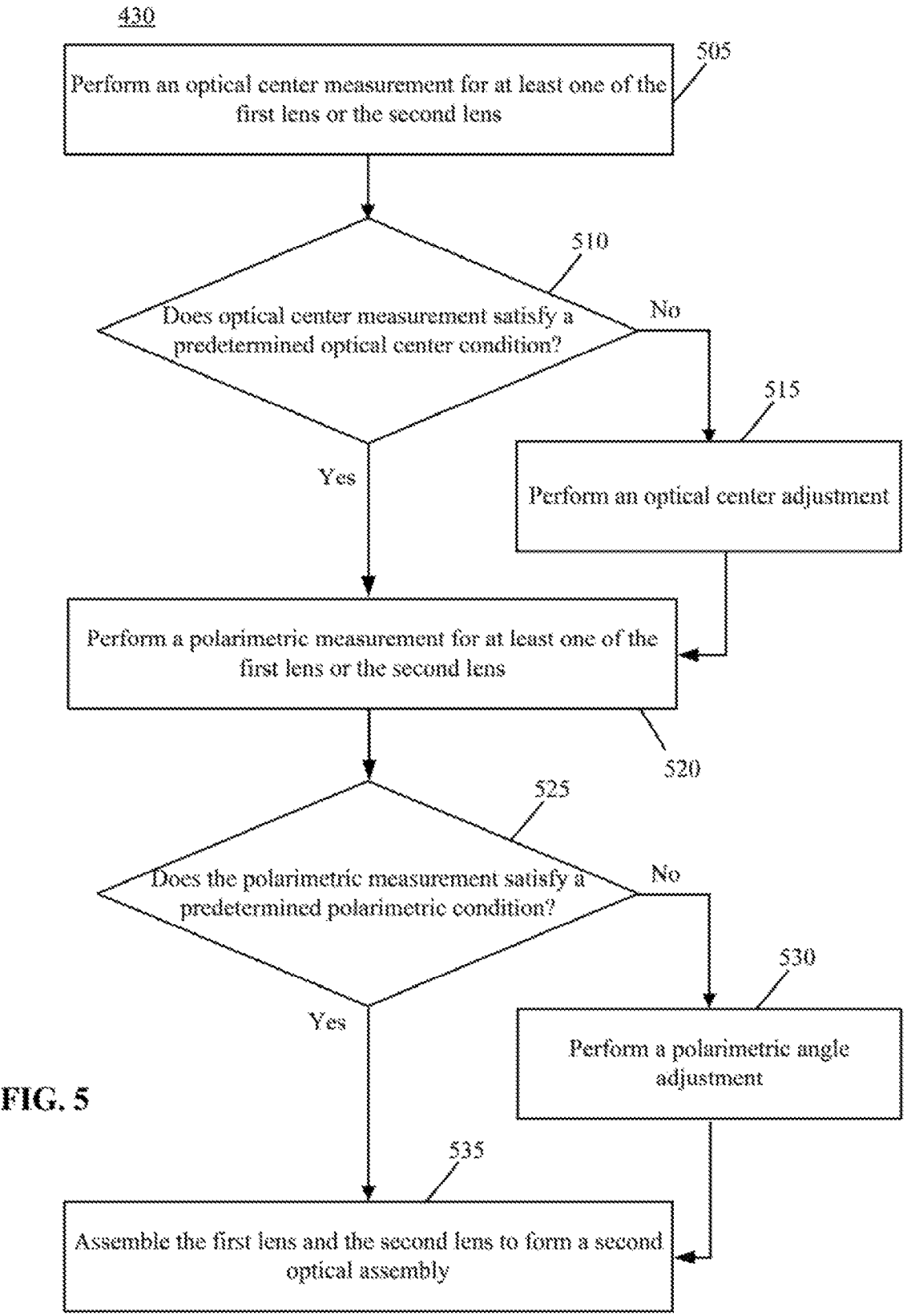
FIG. 5 is a flow chart illustrating example steps that may be included in step 430 of the method shown in FIG. 4.

FIG. 5 is a flow chart illustrates a method for assembling and testing the first lens 203 and the second lens 207 in the second assembly and validation line. The method may be part of the step 430. A person having ordinary skills in the art would appreciate that step 430 may include more or fewer steps than those shown in FIG. 5. In addition, the order of execution of the steps may be different from that shown in FIG. 5. Step 430 may include performing an optical center measurement for at least one of the first lens 203 or the second lens 207 (step 505). Step 430 may also include determining whether the optical center measurement satisfies a predetermined optical center condition (step 510). If the optical center measurement does not satisfy the predetermined optical center condition (No, step 510), step 430 may include performing an optical center adjustment on the lens. As discussed above, the optical center measurement may include at least one of a centering measurement or a tilting measurement, and the optical center adjustment may include at least one of a centering adjustment or a tilting adjustment. In some embodiments, the first lens 203 and the second lens 207 may each be processed in Station 1 and State 2 such that a centering measurement (and a centering adjustment if needed) is separately performed on the first lens 203 and the second lens 207, and a tilting measurement (and a tilting adjustment if needed) is separately performed on the first lens 203 and the second lens 207. In some embodiments, at least one of the first lens 203 or the second lens 207 may not be processed in Station 1 or Station 2. In other words, in some embodiments, the centering measurement (and the centering adjustment if needed) may not be performed for at least one of the first lens 203 or the second lens 207. In some embodiments, the tilting measurement (and the tilting adjustment if needed) may not be performed for at least one of the first lens 203 or the second lens 207. Detailed descriptions of examples of the centering measurement, centering adjustment, tilting measurement, and tilting adjustment may refer to the above descriptions in connection with FIGS. 2 and 3.

When the optical center measurement satisfies a predetermined optical center condition (Yes, step 510), or after the optical center adjustment is performed in step 515, a polarimetric measurement may be performed for at least one of the first lens 203 or the second lens 207 (step 520). As discussed above, the polarimetric measurement may include a measurement relating to a polarization effect of a quarter-wave plate, if a quarter-wave plate is included in any of the first lens 203 and the second lens 207. In some embodiments, the polarimetric measurement may include a measurement relating to a polarization effect of a reflective polarizer if the lens includes a reflective polarizer.

Step 430 may include determining whether the polarimetric measurement satisfies a predetermined polarimetric condition (step 525). If the polarimetric measurement does not satisfy the predetermined polarimetric condition (No, step 525), step 430 may include performing a polarimetric angle adjustment on the lens (step 530). As discussed above in connection with FIGS. 2 and 3, the polarimetric angle adjustment may include a quarter-wave plate angle adjustment if the lens includes a quarter-wave plate, or a reflective polarizer angle adjustment if the lens includes a reflective polarizer. Detailed descriptions of examples of steps 520, 525, and 530 may refer to the above descriptions in connection with FIGS. 2 and 3.

After the polarimetric angle adjustment is performed, step 430 may include assembling the first lens and the second lens to form a second optical assembly (step 535). A quality control test or validation may be performed on the second optical assembly using a display (e.g., display 206) and an image capturing device (e.g., image capturing device 354 shown in FIG. 3). Detailed descriptions of examples of step 535 and the quality control test or validation may refer to the above descriptions in connection with Station 5 shown in FIG. 3. If the second optical assembly passes the quality control test or validation, coupling between the first lens and the second lens included in the second optical assembly may be secured. In addition, the coupling between the display and the second optical assembly may be secured to form a final optical device.

Figure 6:
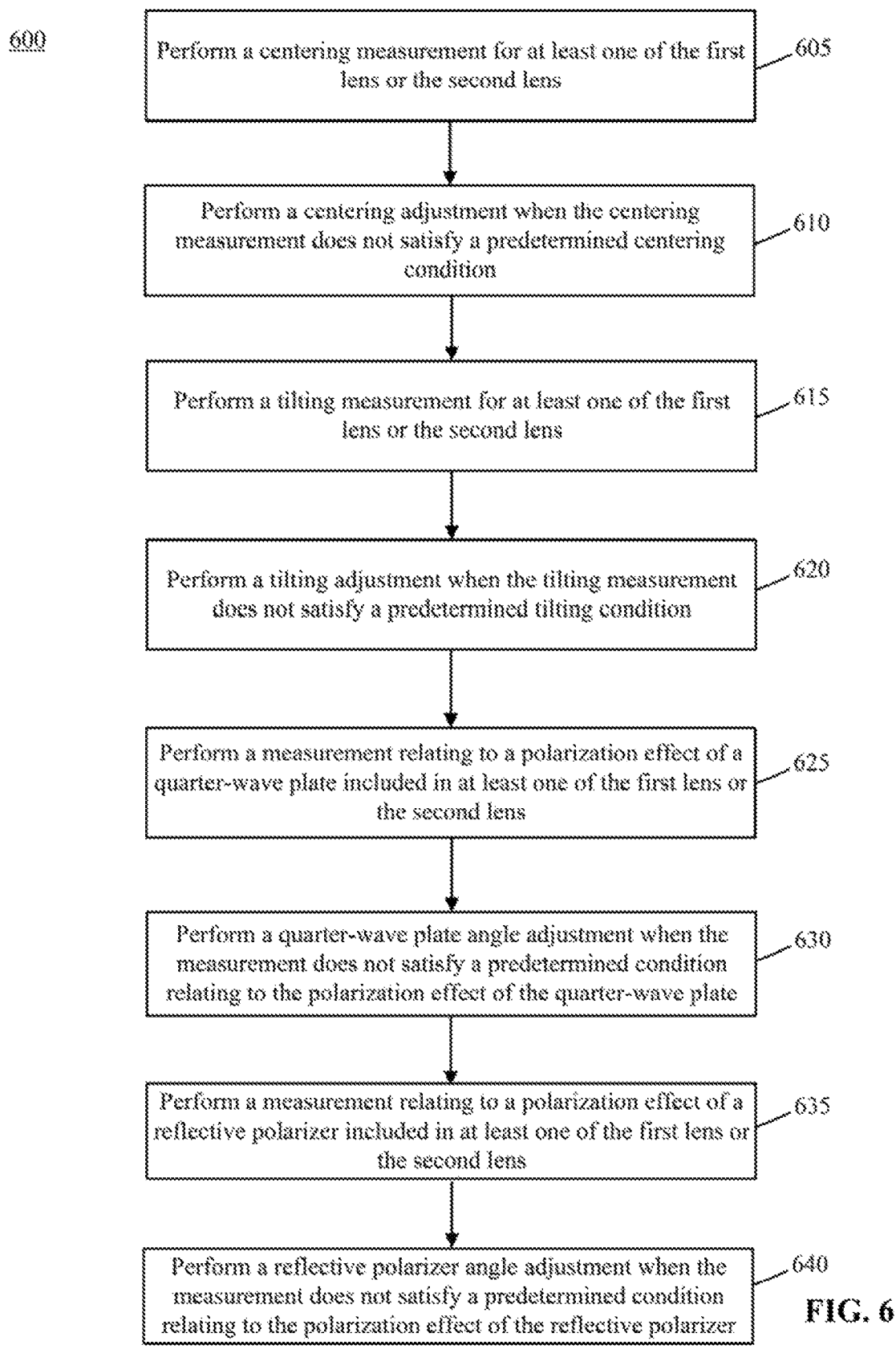
FIG. 6 is a flow chart illustrating a method for processing a plurality of lens in a second assembly and validation line.

FIG. 6 is a flow chart illustrating a method for assembling and testing a first lens and a second lens. Method 600 may be performed by the system 200. In some embodiments, method 600 may be automatically performed by the system 200. A person having ordinary skills in the art would appreciate that method 600 may include more or fewer steps than those shown in FIG. 6. In addition, the order of execution of the steps may be different from that shown in FIG. 6. Method 600 may include performing a centering measurement for at least one of the first lens or the second lens (step 605). For example, a centering measurement may be separately performed for the first lens 203 and the second lens 207, as discussed above in connection with FIGS. 2 and 3. In some embodiments, a centering measurement may not be performed for one or both of the first lens 203 and second lens 207.

Method 600 may include performing a centering adjustment when the centering measurement does not satisfy a predetermined centering condition (step 610). When the centering measurement satisfies the predetermined centering condition, the centering measurement may not be performed. The centering adjustment may be performed by a tool configured to adjust a centering adjustment mechanism, such as one or more screws provided in a lens holder. The centering measurement and the centering adjustment may be controlled by a processor. The processor may analyze the centering measurement to determine whether the centering measurement satisfies the predetermined centering condition. If the centering measurement does not satisfy the predetermined centering condition, the processor may determine an amount of centering adjustment needed and may provide a command to the tool to control the tool to adjust the centering adjustment mechanism. In some embodiments, a closed-loop control system may be formed to automatically adjust the centering of the lens. Detailed descriptions of examples of performing the centering adjustment may refer to the above descriptions in connection with FIGS. 2 and 3.

Method 600 may include performing a tilting measurement for at least one of the first lens or the second lens (step 615). For example, in some embodiments, the tilting measurement may be performed for both of the first lens 203 and the second lens 207 separately. In some embodiments, a tilting measurement may not be performed for one or both of the first lens 203 and the second lens 207. Detailed descriptions of examples of performing the tilting measurement may refer to the above descriptions in connection with FIGS. 2 and 3.

Method 600 may also include performing a tilting adjustment when the tilting measurement does not satisfy a predetermined tilting condition (step 620). When the tilting measurement satisfies the predetermined tilting condition, the tilting adjustment may not be performed. The tilting adjustment may be performed automatically by a tool configured to adjust a tilting adjustment mechanism provided on the lens holder that holds the lens. The processor may control the tilting measurement and the tilting adjustment in an automatically fashion until the tilting measurement satisfies the predetermined tilting condition. Detailed descriptions of examples of performing the tilting adjustment may refer to the above descriptions in connection with FIGS. 2 and 3.

Method 600 may include performing a measurement relating to a polarization effect of a quarter-wave plate included in at least one of the first lens or the second lens (step 625). For example, if the first lens 203 includes a quarter-wave plate, a measurement may be performed for the first lens 203 relating to the polarization effect of the quarter-wave plate. Detailed descriptions of examples of performing the measurement relating to the polarization effect of the quarter-wave plate may refer to the above descriptions in connection with FIGS. 2 and 3.

Method 600 may include performing a quarter-wave plate angle adjustment when the measurement does not satisfy a predetermined condition relating to the polarization effect of the quarter-wave plate (step 630). In steps 625 and 630, the polarization effect of the quarter-wave plate may be verified. If the polarization effect of the quarter-wave plate is not in a desired condition, the quarter-wave plate angle may be adjusted until the desired polarization effect of the quarter-wave plate is achieved (e.g., the first lens 203 including the quarter-wave plate may output a circularly polarized laser beam, as discussed above). Detailed descriptions of examples of performing the quarter-wave plate angle adjustment may refer to the above descriptions in connection with FIGS. 2 and 3.

Method 600 may include performing a measurement relating to a polarization effect of a reflective polarizer included in at least one of the first lens or the second lens (step 635). For example, if the second lens 207 includes a reflective polarizer, a measurement relating to the polarization effect of the reflective polarizer may be performed for the second lens 207. Detailed descriptions of examples of performing the measurement relating to the polarization effect of the reflective polarizer may refer to the above descriptions in connection with FIGS. 2 and 3.

Method 600 may include performing a reflective polarizer angle adjustment when the measurement does not satisfy a predetermined condition relating to the polarization effect of the reflective polarizer (step 640). Steps 635 and 640 may be performed on the second lens 207 to verify whether the reflective polarizer of the second lens 207 has a polarization angle that results in a desired polarization effect. The polarization angle of the reflective polarizer may be adjusted until it is determined that the desired polarization effect has been reached. Detailed descriptions of performing the reflective polarizer angle adjustment may refer to the above descriptions in connection with FIGS. 2 and 3.

In some embodiments, the same station (e.g., Station 3 or Station 4) may be used to process the first lens holder 900 (hence the first lens 203) and the second lens holder 700 (hence the second lens 207). In other words, the steps 625, 630, 635, and 640 may be performed at the same station. For example, the first lens 203 and the second lens 207 may be processed in turn at the station in any order. When the first lens 203 has been processed (e.g., when the quarter-wave plate angle adjustment has been performed), the first lens 203 may be moved out of the station. Then the second lens 207 may be transferred into the station and processed at the station (e.g., the reflective polarizer angle adjustment may be performed). After the second lens 207 is processed, the second lens 207 may be moved out of the station, such that another first lens 203 in the second assembly and validation line 262 may be transferred into the station and processed. The present disclosure does not limit the order in which the first lens 203 and the second lens 207 are processed in the same station. In some embodiments, different stations (e.g., Station 3 and Station 4) may be used to each process one type of lens (e.g., first lens 203 or second lens 207).

Figure 7:
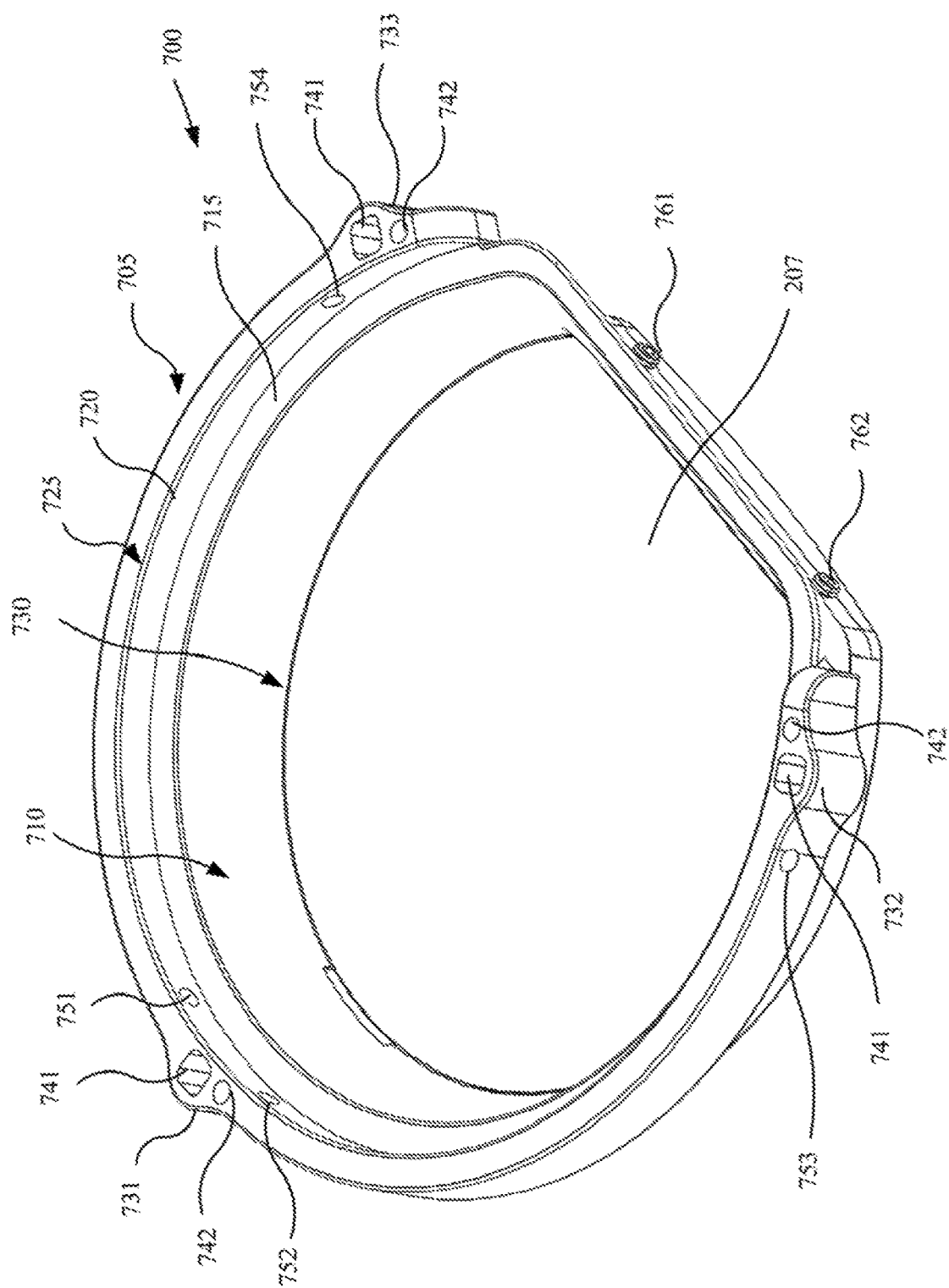
FIG. 7 is a perspective front view of an example second lens holder configured for mounting a second lens.

FIG. 7 is a perspective front view of an example second lens holder 700 configured to mount or for mounting a second lens. For example, the second lens holder 700 may be an embodiment of the second lens holder 227 shown in FIG. 2, and the second lens to be held in the second lens holder 700 may be the second lens 207 shown in FIGS. 2 and 3.

As shown in FIG. 7, the second lens holder 700 may include a substantial cup-shape. The cup-shape may include a larger upper portion 705 (or first portion 705) and a smaller lower portion 710 (or second portion 710). The upper portion 705 and the lower portion 710 each may have a roughly round shape. The upper portion 705 and the lower portion 710 are roughly round because a side of the upper portion 705 and a corresponding side the lower portion 710 may be straight, as shown in FIG. 7. The present disclosure does not limit the shape of the upper portion 705 and the lower portion 710. The upper portion 705 and the lower portion 710 may be other shapes, such as square, rectangle, triangle, etc.

As shown in FIG. 7, the upper portion 705 may define a pocket for receiving a first lens holder. In some embodiments, the upper portion 705 may include a stepped-structure including a supporting surface or a shoulder portion 715 and a wall portion 720. The supporting surface 715 and the wall portion 720 each have a substantially circular shape. The wall portion 720 may be disposed on the supporting surface 715 at an outer edge of the supporting surface 715. The wall portion 720 may be substantially perpendicular to the supporting surface 715. In other words, the wall portion 720 may protrude vertically from the supporting surface 715.

The upper portion 705 may have a first opening 725 and the lower portion 710 may have a second opening 725. The lower portion 710 may include a side wall extending from the supporting surface 715 of the upper portion 705 to the second opening 725. The lower portion 710 gradually reduces its dimension as it extends from the supporting surface 715 to the second opening 725. As shown in FIG. 7, a dimension of the upper portion 705 is larger than a dimension of the lower portion 710. For example, a width or a circumference of the first opening 725 associated with the upper portion 705 is larger than a width or a circumference of the second opening 730 associated with the lower portion 710.

The wall portion 720 may include a plurality of ear portions protruding from the wall portion 720. For example, the wall portion 720 may include a first ear portion 731, a second ear portion 732, and a third ear portion 733 each protruding from an outer surface of the wall portion 720. The present disclosure does not limit the number of ear portions that may be included in the wall portion 720, which may be one, two, four, five, etc. Each ear portion may include a plurality of vertical holes, which may be through holes penetrating a top surface and a bottom surface of each ear portion. For example, as shown in FIG. 7, each ear portion may include a first vertical hole 741 and a second vertical hole 742.

Each of the first vertical holes 741 may be configured to receive a screw. For example, when the second lens holder 700 is mounted to a rotation stage in the second assembly and validation line 262 discussed above in connection with FIGS. 2 and 3, the screws inserted into the first vertical holes 741 may be used for securing the second lens holder 700 to a mounting bracket of the rotation stage. The screws inserted into the first vertical holes 741 may also be used to adjust the centering of the second lens 207 after the second lens is mounted to the second lens holder 700. When the screws inserted into the first vertical holes 741 are loosened, the second lens holder 700 may be moved horizontally to adjust the centering of the second lens holder 700 relative to the rotation stage.

Each of the second vertical holes 742 may be configured to receive a screw. When the second lens holder 700 is mounted to a mounting bracket of the rotation stage, a screw may be inserted into each of the second vertical holes 742 for adjusting the tilting of the second lens 207. For example, in some embodiments, when a screw in any one of the second vertical holes 742 is screwed in, the corresponding ear portion where the screw is located may be pushed up (e.g., the ear portion may be pushed up away from the mounting bracket), thereby changing the tilting of the second lens holder 700 (and hence the second lens 207) relative to the rotation stage (e.g., relative to the mounting bracket). In some embodiments, each of the second vertical holes 742 may receive a screw for securing a base cover configured to mount a display to the second lens holder 700, as discussed below in connection with FIG. 28. The present disclosure does not limit the number of through holes provided on each ear portion, which may be one, three, four, etc.

The wall portion 720 may also include a plurality of side holes extending horizontally and penetrating an inner side surface and an outer side surface of the vertical wall portion 720. For example, as shown in FIG. 7, the wall portion 720 may include a first side hole 751, a second side hole 752, a third side hole 753, and a fourth side hole 754. Any other suitable number of side holes may be included, such as one, two, three, five, six, etc. Each side hole may be configured to receive a screw. In some embodiments, the screws may be configured to secure the first lens holder 217 to the second lens holder 700 after the first lens holder is mounted to the second lens holder 700.

As shown in FIG. 7, the second lens holder 700 may be configured to mount or hold the second lens 207. For example, the second lens 207 may be disposed at the second opening 725 of the lower portion 710. The second lens 207 may be secured at the second opening 725 of the lower portion 710 through any suitable methods. For example, the second lens 207 may be secured to the second lens holder 700 by screws provided on the second lens holder 700. In the embodiment shown in FIG. 7, the second lens holder 700 includes two side holes (first side hole 761 and second side hole 762) on the lower portion 710 for receiving screws that may be used to secure the second lens 207 to the second lens holder 700 (e.g., the lower portion 710 of the second lens holder 700). In other embodiments, the second lens 207 may be glued to the lower portion 710 using a glue after the second lens 207 is inserted at the second opening 730 of the second lens holder 700. For example, an ultraviolet curable glue (a UV glue) may be applied to the circumference of the second lens 207 to glue the second lens 207 to the lower portion 710 of the second lens holder 700 at or near the second opening 730.

Although not shown in FIG. 7, as described below, the first lens holder 217 (with the first lens 203) may be mounted to the second lens holder 700. For example, the first lens holder 217 may be disposed in the pocket defined by the upper portion 705. In some embodiments, the first lens holder 217 may be placed on and supported by the supporting surface 715 of the upper portion. The first lens holder 217 may be secured to the second lens holder 700 using any suitable method. In some embodiments, the first lens holder 217 may be secured to the second lens holder 700 using screws, such as screws inserted into the side holes 751, 752, 753, and 754 provided on the wall portion 720. In some embodiments, the first lens holder 217 may be secured to the second lens holder 700 using a glue, such as a UV curable glue.

Figure 8:
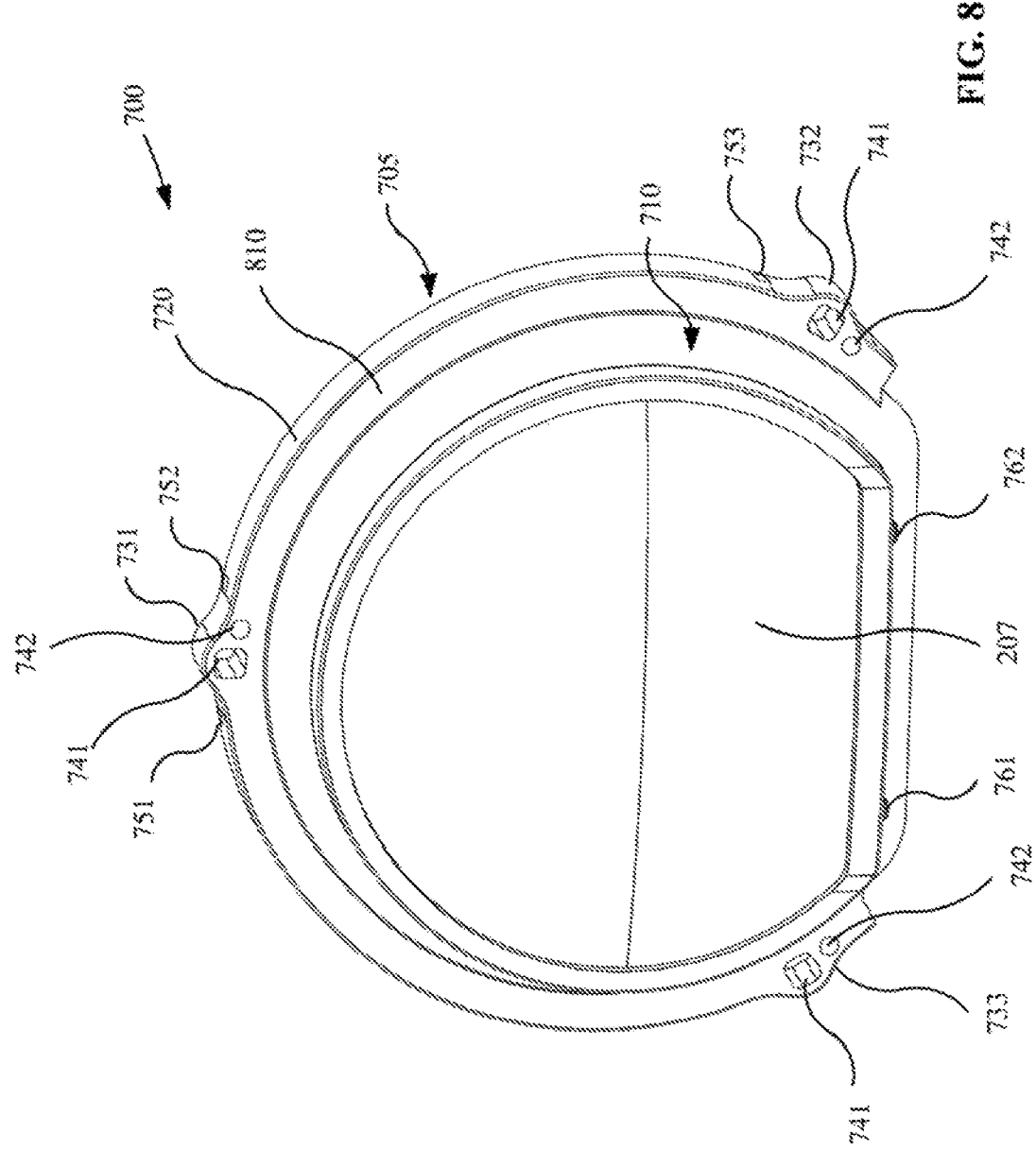
FIG. 8 is a perspective back view of the second lens holder shown in FIG. 7.

FIG. 8 is a perspective back view of the second lens holder 700. FIG. 8 shows the overall cup shape of the second lens holder 700. As shown in FIG. 7 and FIG. 8, the upper portion 705 and the lower portion 710 each have a cross section having a substantial D-shape, which is a circular shape with a straight side. FIG. 8 also shows that a size of the lower portion 710 gradually reduces as it extends from the upper portion 705 to the second opening 730 where the second lens 207 is mounted. As shown in FIG. 8, the wall portion 720 of the second lens holder 700 may include a lower surface 810. The lower surface 810 may rest on a mounting bracket when the second lens holder 700 is mounted to the mounting bracket, as discussed below in connection with FIG. 12.

Figure 9A:
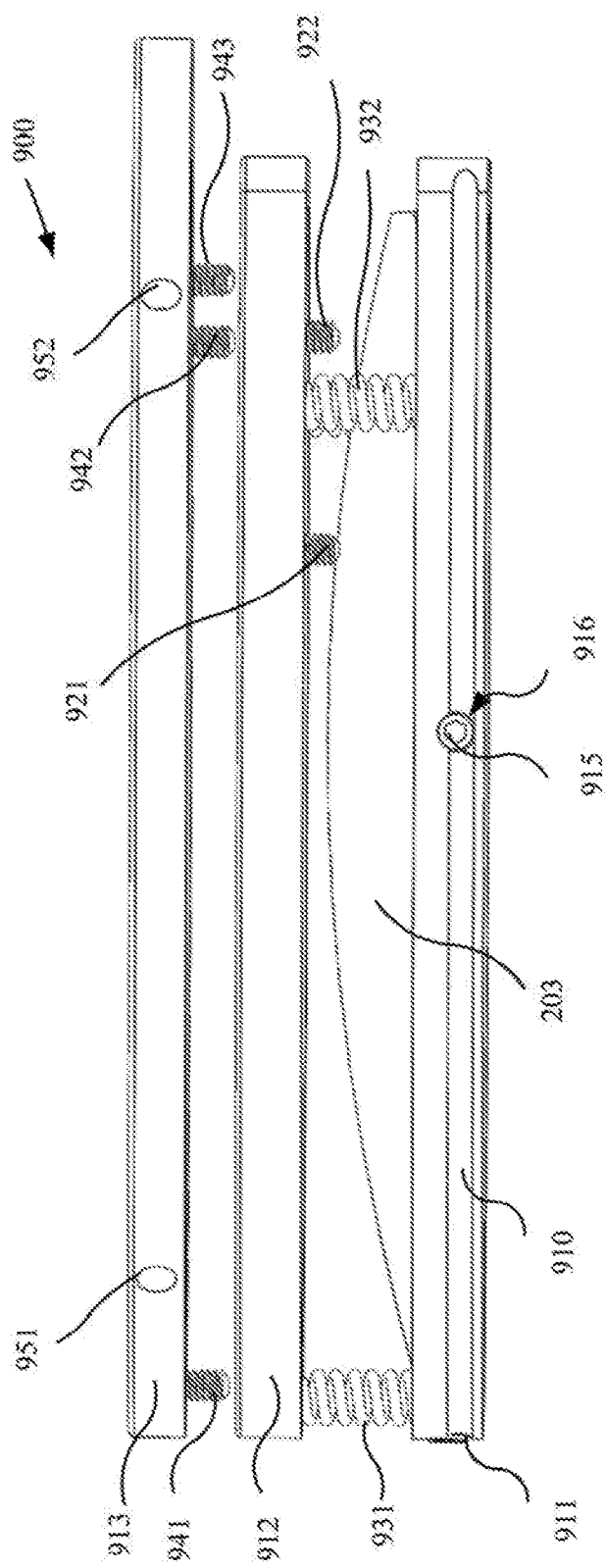
FIG. 9A is an exploded side view of a first lens holder configured for mounting a first lens.
Figure 9B:
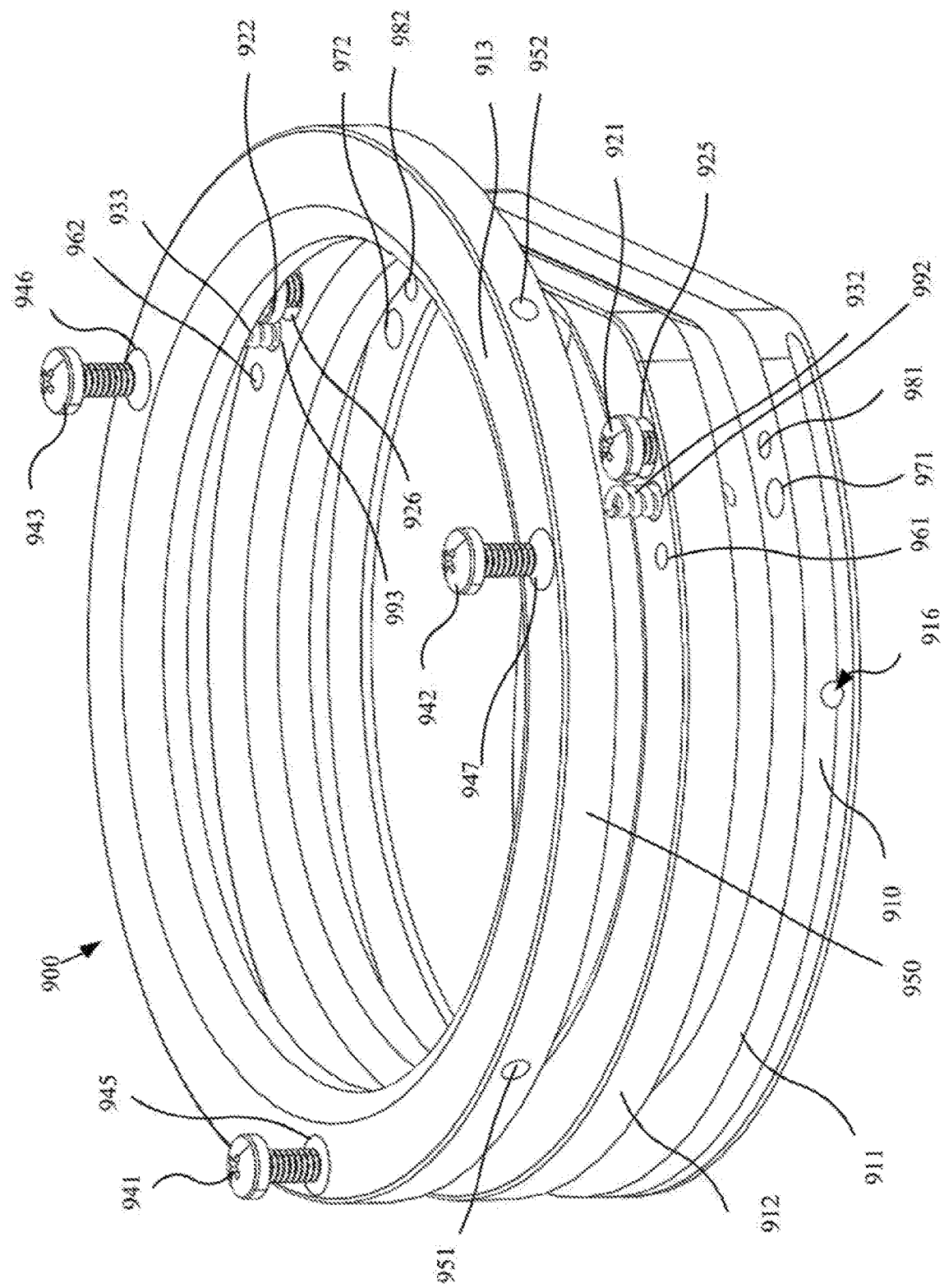
FIG. 9B is an exploded perspective view of the first lens holder shown in FIG. 9A.
Figure 10:
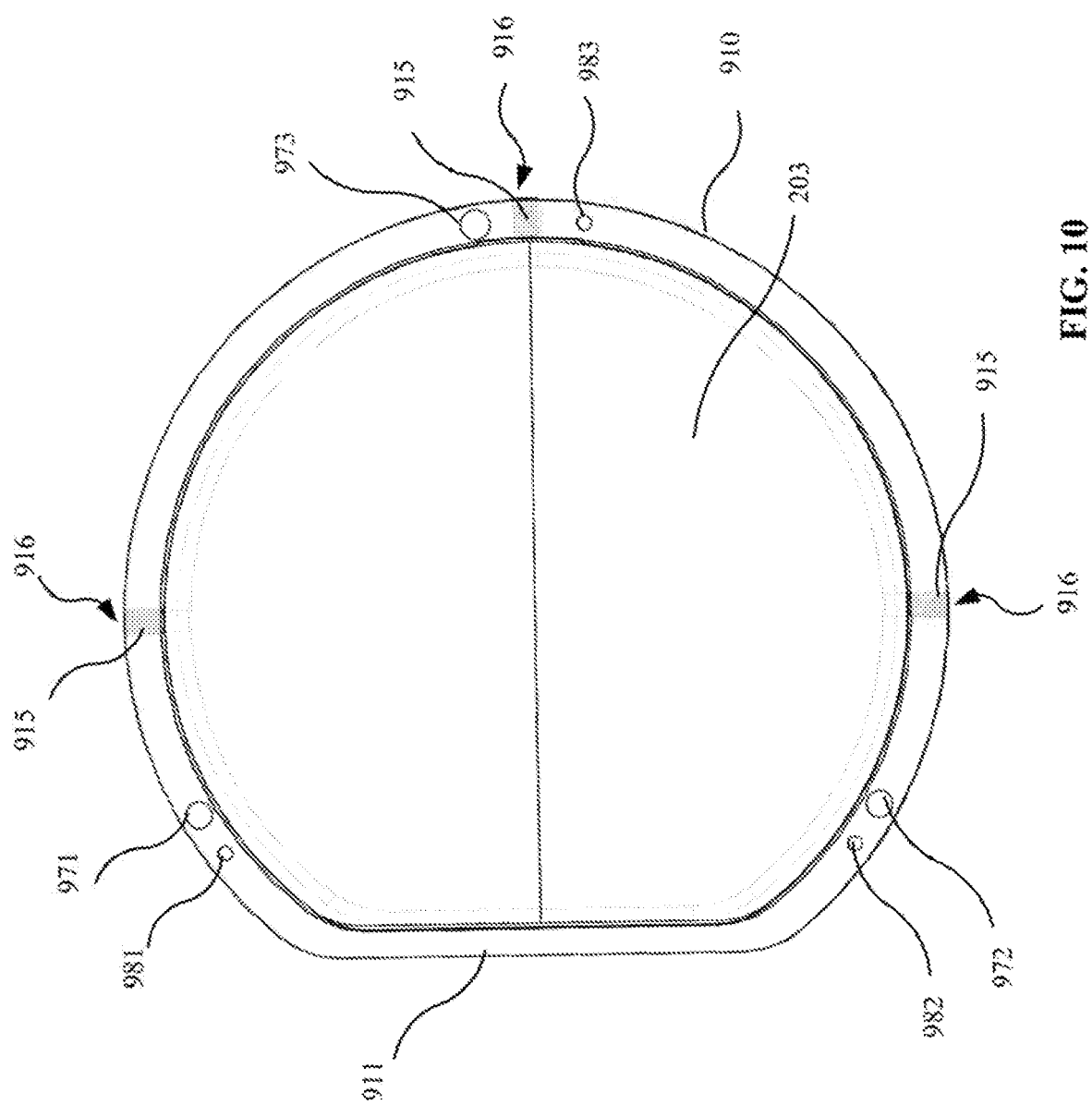
FIG. 10 is a schematic illustration of a top cross-sectional view of a first member included in the first lens holder with the first lens mounted thereon.

FIG. 9A is an exploded side view of a first lens holder 900. FIG. 9B is an exploded perspective view of the first lens holder 900. The first lens holder 900 may be configured to mount a first lens, such as the first lens 203. The first lens holder 900 may be an embodiment of the first lens holder 217 shown in FIGS. 2 and 3. For example, the first lens holder 900 may include three members stacked and connected together, a first member 911, a second member 912, and a third member 913, with the second member 912 being disposed between the first member 911 and the third member 913. Each of the first member 911, the second member 912, and the third member 913 may include a ring-shaped structure. Specifically, in some embodiments, the first member 911 and the second member 912 may each have a D-shape, as shown in FIG. 9A and FIG. 9B, which matches the shape of the upper portion 705 of the second lens holder 700. The third member 913 may have a circular shape (or regular round or ring shape). For illustrative purposes, the first member 911, the second member 912, and the third member 913 are shown as separated from each other in order to show internal elements. The first member 911 may be configured to hold or mount the first lens 203. For example, the first lens 203 may be securely mounted to the first member 911 by one or more screws 915 inserted in one or more side through holes 916 provided on a circumferential side wall 910 of the first member 911, as also shown in FIG. 9A. The side view shown in FIG. 9A shows only one side through hole 916. Any suitable number of side through holes 916 may be provided on the circumferential side wall 910 of the first member 911. The number of side through holes 916 may be two, three, four, etc. For example, in one embodiment, the first lens 203 may be secured to the first member 911 through three screws 915 (hence the first member 911 may include three side through holes 916), as shown in FIG. 10. In some embodiments, the centering of the first lens 203 may be adjusted through adjusting one or more of the screws 915.

The first member 911 and the second member 912 may be connected or coupled together through one or more screws. Any suitable number of screws, such as one, two, three, four, five, six, etc., may be provided for securing the first member 911 and the second member 912. In one embodiment, three screws are provided from the top side of the second member 912. FIG. 9A and FIG. 9B only show two screws 921 and 922. The screws 921 and 922 may be inserted into through holes 925 and 926 (shown in FIG. 9B) provided in the second member 912 and further into holes 981 and 982 (shown in FIG. 9B) provided on the first member 911 to secure the connection between the first member 911 and the second member 912. There may be a third screw (not shown in FIG. 9B) provided on the second member 912 near the end where the screw 941 is located. The third screw may penetrate a though hole provided on the second member 912, and may be received in a hole 983 (shown in FIG. 10) provided on the first member 911.

The third member 913 and the second member 912 may be connected using one or more screws. The third member 913 may include a plurality of through holes for receiving the one or more screws. FIG. 9B shows tha the third member 913 includes three through holes 945, 946, and 947. Any other suitable number of through holes may be included in the third member 913, such as one, two, four, five, six, etc. FIG. 9A and FIG. 9B show three screws 941, 942, and 943 inserted, from above the third member 913, into the corresponding through holes 945, 946, and 947 to couple the third member 913 and the second member 912. The present disclosure does not limit the number of screws for coupling the third member 913 and the second member 912, which may be one, two, four, five, six, etc. The second member 912 may include holes (which may or may not be through holes) configured to receive the corresponding screws 941, 942, and 943, for securing the third member 913 with the second member 912. In the view of FIG. 9B, only two holes 961 and 962 are shown in the second member 912. The second member 912 may include a third hole (not shown) for receiving screw 941.

One or more springs may be disposed between the third member 913 and the first member 911. For example, the one or more springs may be disposed between a lower portion of the third member 913 and a top portion of the first member 911. The each of the springs may penetrate a though hole (e.g., 992, 993) provided on the second member 912. FIG. 9A shows two springs 931 and 932, and FIG. 9B shows two springs 932 and 933. Thus, in the embodiment shown in FIG. 9A and FIG. 9B, there are three springs 931, 932, and 933. The present disclosure does not limit the number of springs, which may be one, two, four, five, six, etc. The first member 911 may include a depression or hole (which is not a through hole) 971, 972, or 973 (shown in FIG. 10) for receiving an end of a spring. Correspondingly, the third member 913 may include a depression or hole (which is not a through hole and is not shown in FIG. 9B) for receiving another end of the spring. When the first member 911, the second member 912, and the third member 913 are assembled, the first member 911 and the second member 912 are coupled together by screws 921 and 922 (and maybe a third screw not visible in FIG. 9B but located on the screw 941 end of the second member 912). The third member 913 may be coupled with the second member 912 through the screws 941, 942, and 943. The springs 931, 932, and 933 may be in a compressed state (e.g., loaded), applying a resilient force on both the lower portion of the third member 913 and the top portion of the first member 911, which pushes the third member 913 apart from the first member 911 and the second member 912. When one or more of the screws 941, 942, and 943 are adjusted, one or more of the springs 931, 932, and 932 may push the first member 911 and the third member 913 apart with a larger or smaller resilient force, thereby causing a change in a tilting angle (or tilting) of the first member 911 (together with the second member 912) relative to the third member 913, which may be mounted to a rotation stage during the tilting adjustment and may be fixed relative to the rotation stage. As a result, the tilting of the first lens 203 may be adjusted by adjusting the screws 941, 942, and 943. Thus, the screws 941, 942, and 943, and the springs 931, 932, and 933 may form a tilting adjustment mechanism of the first lend holder 900.

The third member 913 may include one or more depressions or holes on a side circumferential wall 950, each depression or hole configured to receive a screw. One or more depressions or holes may be included on the side circumferential wall 950 of the third member 913. For example, FIG. 9A and FIG. 9B show two depressions or holes 951 and 952. Any other suitable number of depressions or holes may be included, such as one, three, four, five, six, etc. When the first lens holder 900 is mounted to a rotation stage, the third member 913 may be coupled to a mounting bracket of the rotation stage. For example, the third member 913 may be secured to the mounting bracket through screws inserted into through holes provided on the mounting bracket of the rotation stage. The screws may be received in the depressions or holes 951 and 952 provided on the side circumferential wall 950 of the third member 913, thereby securely coupling the third member 913 (and hence the entire first lens holder 900) with the mounting bracket of the rotation stage, which will be described below. Each of the screws for securing the third member 913 to the mounting bracket may be a push-pull type, which means turning the screw in or out may push or pull the third member 913, thereby adjusting the centering of the third member 913 (and hence the entire first lens holder 900 including the first lens 203 held by the first member 911) relative to the rotation stage.

FIG. 10 is a schematic illustration of a cross-sectional top view of the first member 911 with the first lens 203 mounted thereon. FIG. 10 shows the ring-shaped structure of the first member 911. The second member 912 may have the same ring-shaped structure. The ring-shaped structure may appear to have a D-shape. In some embodiments, the third member 913 may have a matching D-shape, or may have a substantially circular ring shape, as shown in FIG. 9B, rather than having a D-shape.

As shown in FIG. 10, a plurality of side through holes 916 may be provided on the circumferential side wall 910 of the first member 911. In the embodiment shown in FIG. 10, three side through holes 916 are included on the circumferential side wall 910. Any other suitable number of side through holes may be included, such as one, two, four, five, six, etc. A plurality of screws 915 (e.g., set screws) may be inserted into the side through holes 916 to abut against the first lens 203, thereby mounting and securing the first lens 203 to the first member 911. In some embodiments, the centering of the first lens 203 may be adjusted by adjusting one or more of the screws 915. FIG. 10 also shows three holes 981, 982, and 983 for receiving the springs 931, 932, and 933. Any other suitable number of holes may be included for receiving the springs (the number of holes may be the same as the number of the springs). FIG. 10 further shows three holes 971, 972, and 973 for receiving screws 921, 922, and a third screw not shown in FIG. 9B for coupling the second member 912 with the first member 911.

Figure 11:
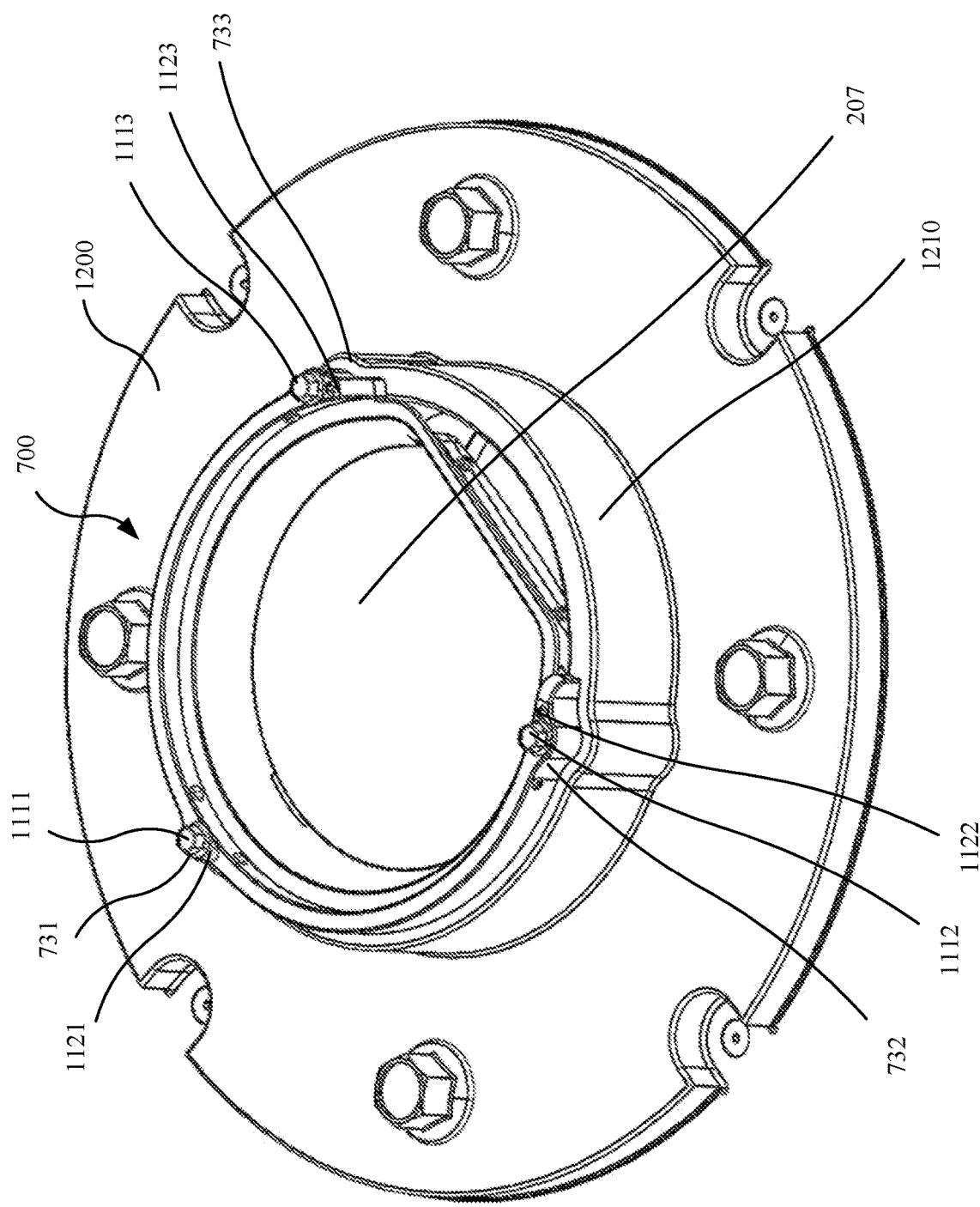
FIG. 11 is a perspective view of a portion of a rotation stage with the second lens holder mounted thereon.

FIG. 11 is a perspective view of a portion of a rotation stage with the second lens holder 700 mounted thereon. The second lens holder 700 may be mounted to a rotation stage 1200 during an assembling and alignment validation process discussed above in connection with the second assembly and validation line 262 shown in FIGS. 2-3. For example, the second lens holder 700 may be mounted to a mounting bracket 1210 of the rotation stage 1200. In some embodiments, the mounting bracket 1210 may have a shape that matches the shape of the second lens holder 700. For example, the mounting bracket 1210 may be a vertical, substantially circular wall. The second lens holder 700 may be supported by a top surface of the mounting bracket 1210. For example, the lower surface 810 (shown in FIG. 8) of the wall portion 720 and lower surfaces of the protruding ear portions 731, 732, and 733 of the wall portion 720 may be supported by the top surface of the mounting bracket 1210.

The mounting bracket 1210 may include vertical holes at locations corresponding to the first vertical holes 741 provided on the ear portions 731, 732, and 733 of the second lens holder 700. The vertical holes of the mounting bracket 1210 may be connected to the first vertical holes 741 on the second lens holder 700. A screw may be inserted into each first vertical hole 741 on the second lens holder 700 and further into a corresponding vertical hole on the mounting bracket 1210 such that the second lens holder 700 may be secured to the mounting bracket 1210. FIG. 11 shows three screws 1111, 1112, and 1113 inserted into three first vertical holes 741 provided on the ear portions 731, 732, and 733. The number of ear portions may be any other numbers, such as two, four, five, six, etc. The number of first vertical holes 741 may be any other numbers, such as two, four, five, six, etc. Correspondingly, the number of screws inserted into the first vertical holes 741 may be any other numbers, such as two, four, five, six, etc. A screw may be inserted into a second vertical hole 742 on the second lens holder 700. FIG. 11 shows three screws 1121, 1122, and 1123 inserted into three second vertical holes 742 provided on the three ear portions 731, 732, and 733. Each of the screws inserted into the second vertical holes 742 may abut against the top surface of the mounting bracket 1210. When the screw inserted into the second vertical hole 742 is adjusted, the tilting of the second lens holder 700 relative to the rotation stage 1200 may be adjusted. For example, when the screw inserted into the second vertical hole 742 is further screwed in, the screw may further push against the top surface of the mounting bracket 1210, and further push up the second lens holder 700, thereby adjusting the tilting of the second lens holder 700 (and hence the second lens 207 held by the second lens holder 700) relative to the rotation stage 1200.

Figure 12:
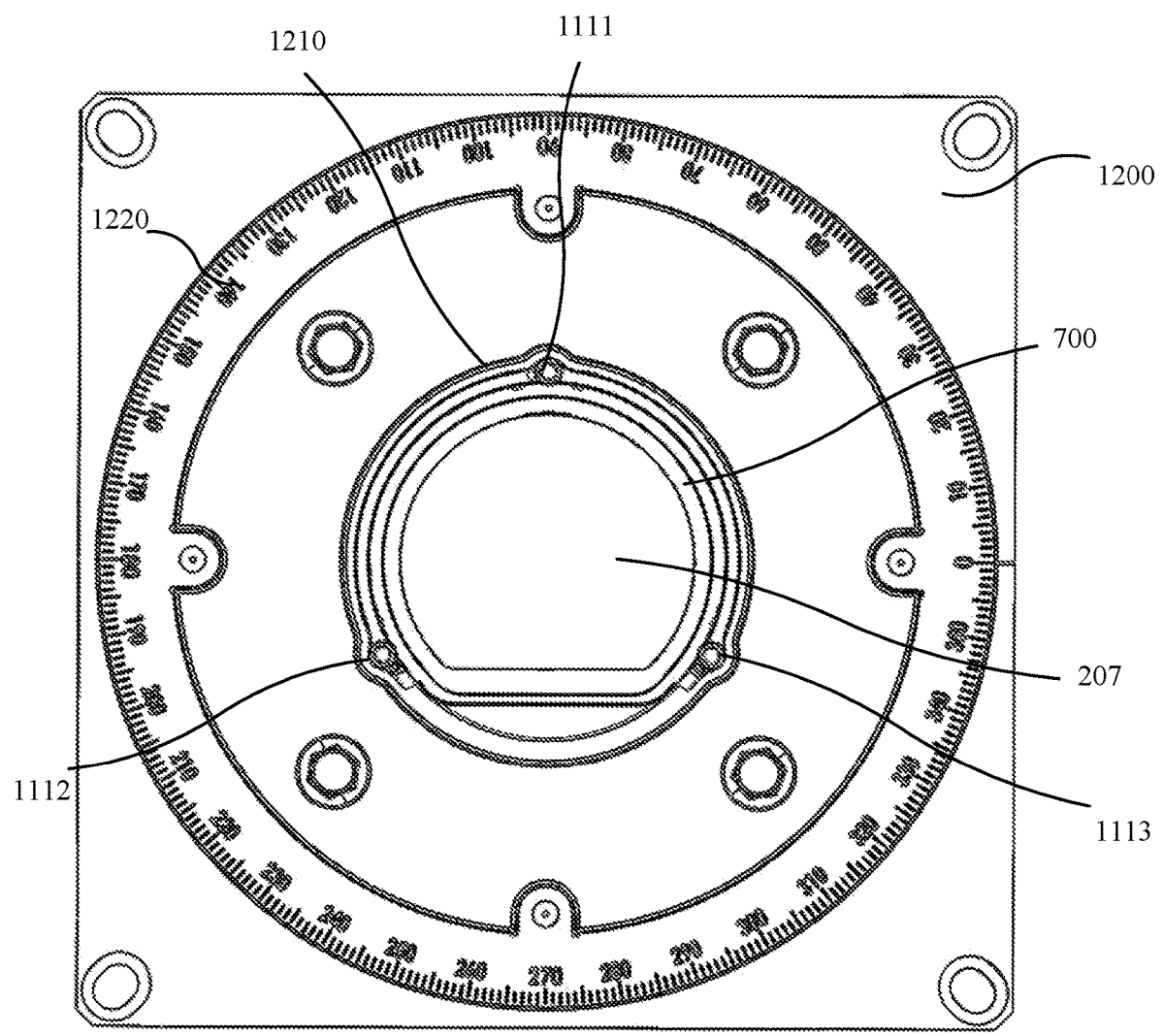
FIG. 12 is a top view of the second lens holder mounted on the rotation stage.

FIG. 12 is a top view of the second lens holder 700 mounted on the rotation stage 1200. As shown in FIG. 12, the rotation stage 1200 may include an angle scale 1220 for indicating the turning angle of the second lens holder 700 (hence the second lens 207), which may be recorded and referred to in Station 4 as a reflective polarizer angle, as discussed above. The angle may be used for aligning the first lens holder 900 (hence the first lens 203) and the second lens holder 700 (hence the second lens 207). FIG. 12 shows a screw 1311 (1312, or 1313) inserted into the first vertical hole 741 provided on the ear portion of the second lens holder 700. The screws 1311, 1312, 1313 may secure the second lens holder 700 to the mounting bracket 1210. The screws 1311, 1312, 1313 may also be adjusted (e.g., loosened) to allow the centering of the second lens holder 700 (and hence the second lens 207 mounted on the second lens holder 700) to be adjusted relative to the rotation stage.

Although it is not clearly shown in FIG. 12, a screw may be inserted into the second vertical hole 742 at each ear portion. The screws in the second vertical holes 742 may abut against the top surface of the mounting bracket 1210. When any of the screws in the second vertical holes 742 is adjusted, the corresponding ear portion may be pushed up (i.e., raised up), thereby adjusting the tilting of the second lens holder 700 (and hence the second lens 207 mounted on the second lens holder 700) relative to the rotation stage 1200.

Figure 13:
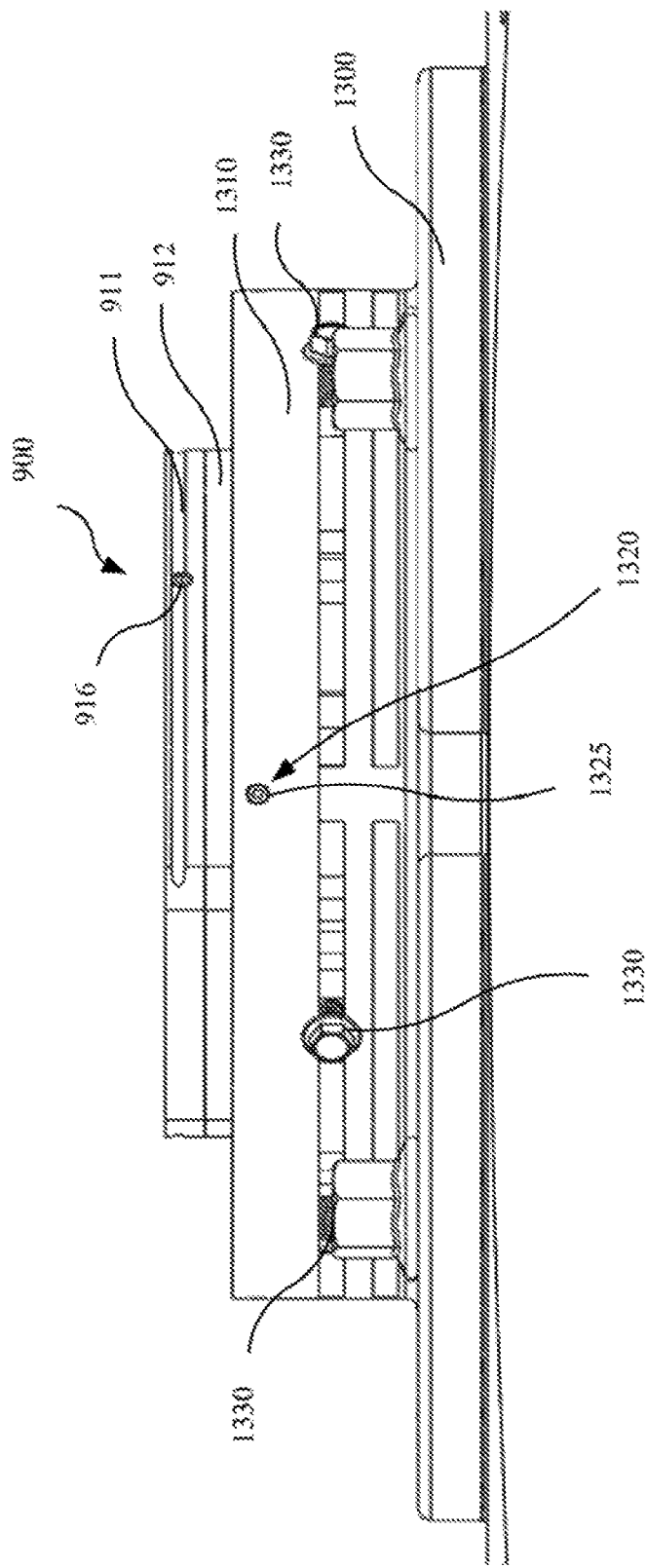
FIG. 13 is a side view of the first lens holder mounted to a rotation stage.

FIG. 13 is a side view of the first lens holder 900 mounted to a rotation stage 1300. As shown in FIG. 13, the rotation stage 1300 may include a mounting bracket 1310 configured for mounting or to mount the first lens holder 900. The first lens holder 900 may include the first member 911 that holds the first lens 203, the second member 912, and the third member 913. The third member 913 is not visible in the view shown in FIG. 13, as it is blocked by the mounting bracket 1310. The first member includes the one or more side holes 916 configured to secure the first lens 203.

The mounting bracket 1310 may include one or more side holes on a vertical wall at locations corresponding to the one or more depressions or holes 951 and 952 provided on the third member 913 of the first lens holder 900, as shown in FIG. 9. Although the side view of FIG. 13 shows one side hole 1320 with a screw 1325 inserted therein, the mounting bracket 1310 may include any suitable number of side holes 1320, such as two, three, four, etc. The side holes 1320 may be through holes and may be connected with the depressions or holes 951 and 952. The screws 1325 may extend throughout the side holes 1320, and further extend into the depressions or holes 951 and 952, thereby securing the first lens holder 900 on the mounting bracket 1310. In one embodiment, four side holes 1320 are included in the mounting bracket 1310, and four screws 1325 may be used to secure the first lens holder 900 on the mounting bracket 1310.

In some embodiments, each of the screws 1325 may be a push-pull type. That is, adjusting the screw 1325 may push or pull the first lens holder 900 in a horizontal direction (e.g., in a plane in which the first lens 203 is positioned), thereby adjusting the centering of the first lens holder 900 (and hence the first lens 203 held by the first lens holder 900) relative to the rotation stage 1300. Centering adjustment through the screws 1325 may move the optical axis of the first lens 203 to overlap with the rotation axis of the rotation stage 1300.

Figure 22:
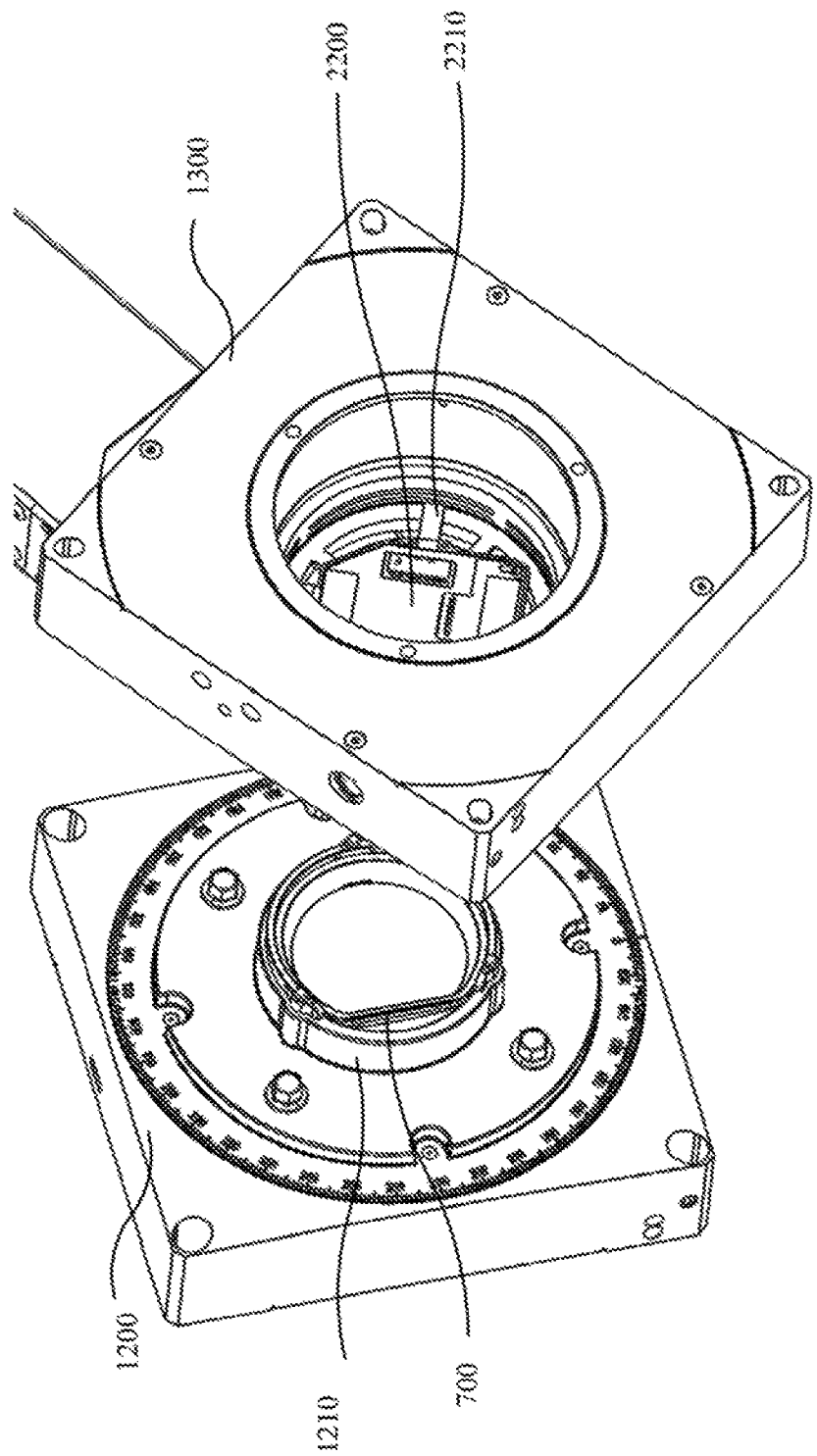
FIG. 22 is a perspective view of two rotation stages facing each other.
Figure 23:
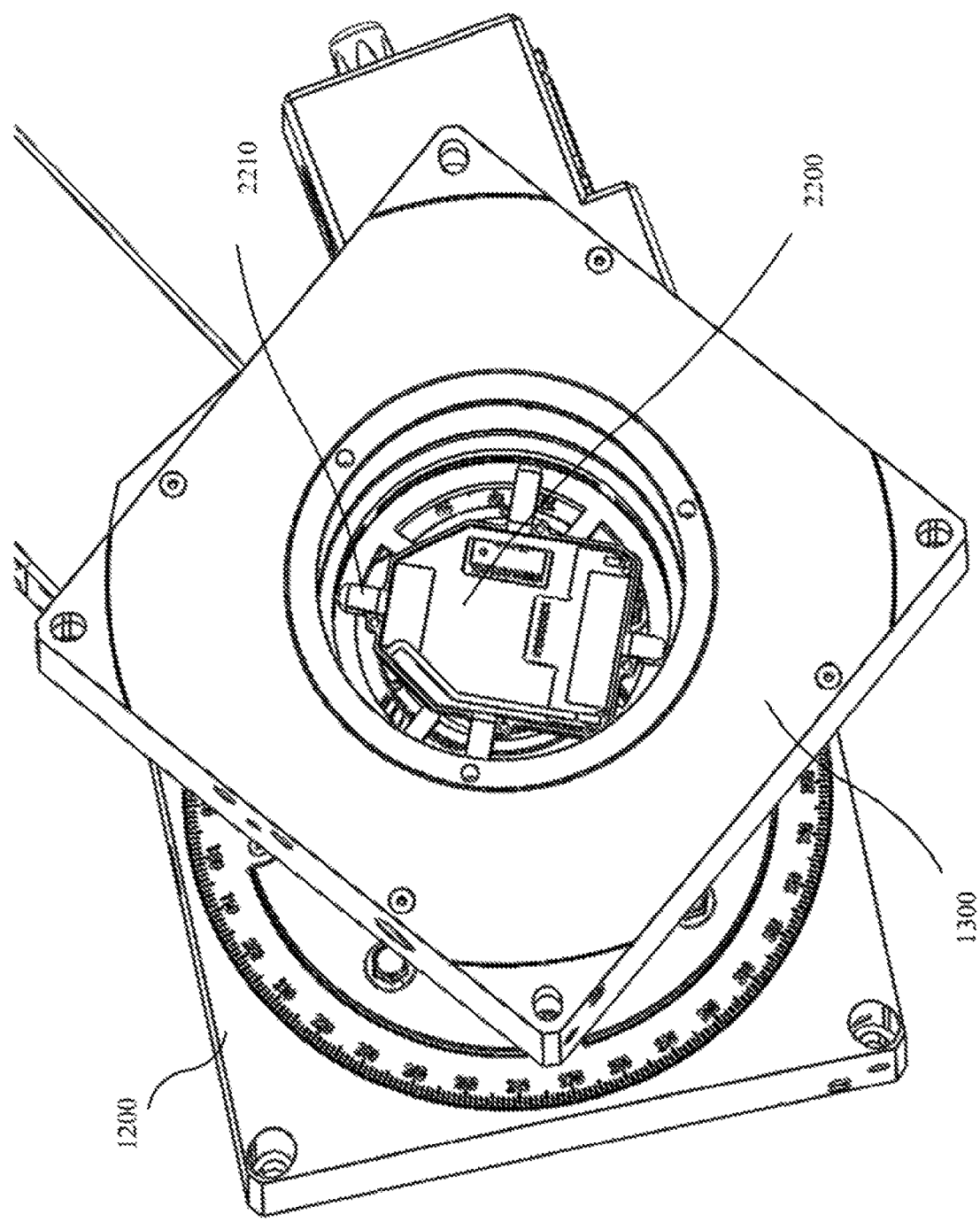
FIG. 23 is another perspective view the two rotation stages.

One or more screws 1330 may be configured for securing a display mounting bracket for mounting a display to the back of the first lens holder 900 during an alignment validation process, as shown in FIGS. 22-23. The one or more screws 1330 may also be adjusted to change the centering of the display relative to the first lens 203. Any suitable number of screws 1330 may be used, such as one, two, three, four, etc. In some embodiments, four screws 1330 are used to secure and adjust the centering of the display.

Figure 14:
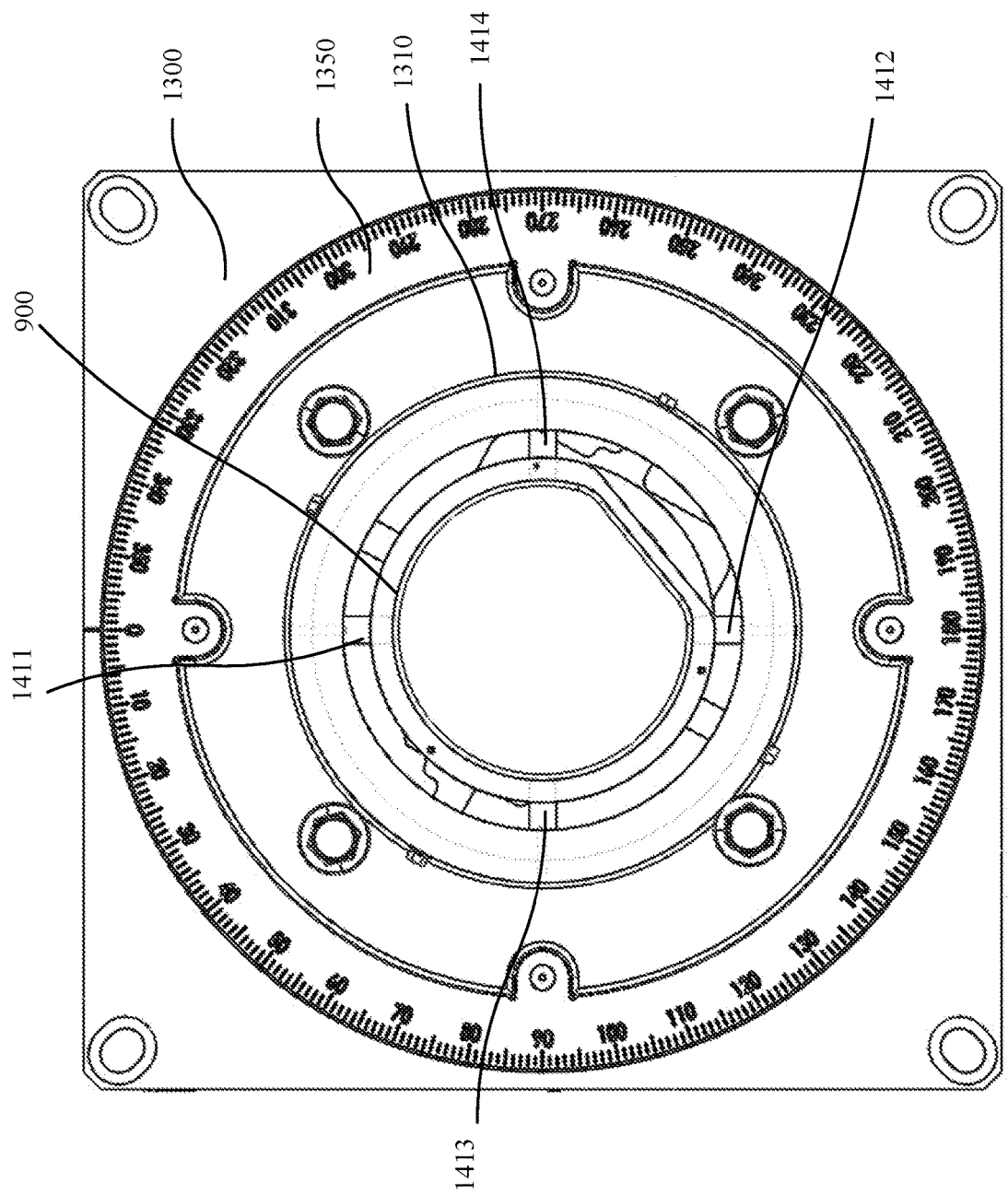
FIG. 14 is a top view of the first lens holder mounted to a rotation stage.

FIG. 14 shows a top view of the first lens holder 900 mounted to the rotation stage 1300. As shown in FIG. 14, the mounting bracket 1310 may include a plurality of flanges 1411, 1412, 1413, 1414 (four shown in FIG. 14) extending into the inner space defined by the mounting bracket 1310. The flanges may be configured to support the first lens holder 900 when the first lens holder 900 is placed into the inner space defined by the mounting bracket 1310. Any other suitable number of flanges may be included in the mounting bracket 1310, such as two, three, five, six, etc.

FIG. 14 further shows that the rotation stage 1300 may include an angle scale 1350 for indicating the turning angle of the first lens 203 (i.e., the first lens holder 900), which may be recorded in Station 3 as a quarter-wave plate angle. The angle may be used for aligning the first lens holder 900 (hence the first lens 203) and the second lens holder 700 (hence the second lens 207).

Figure 15:
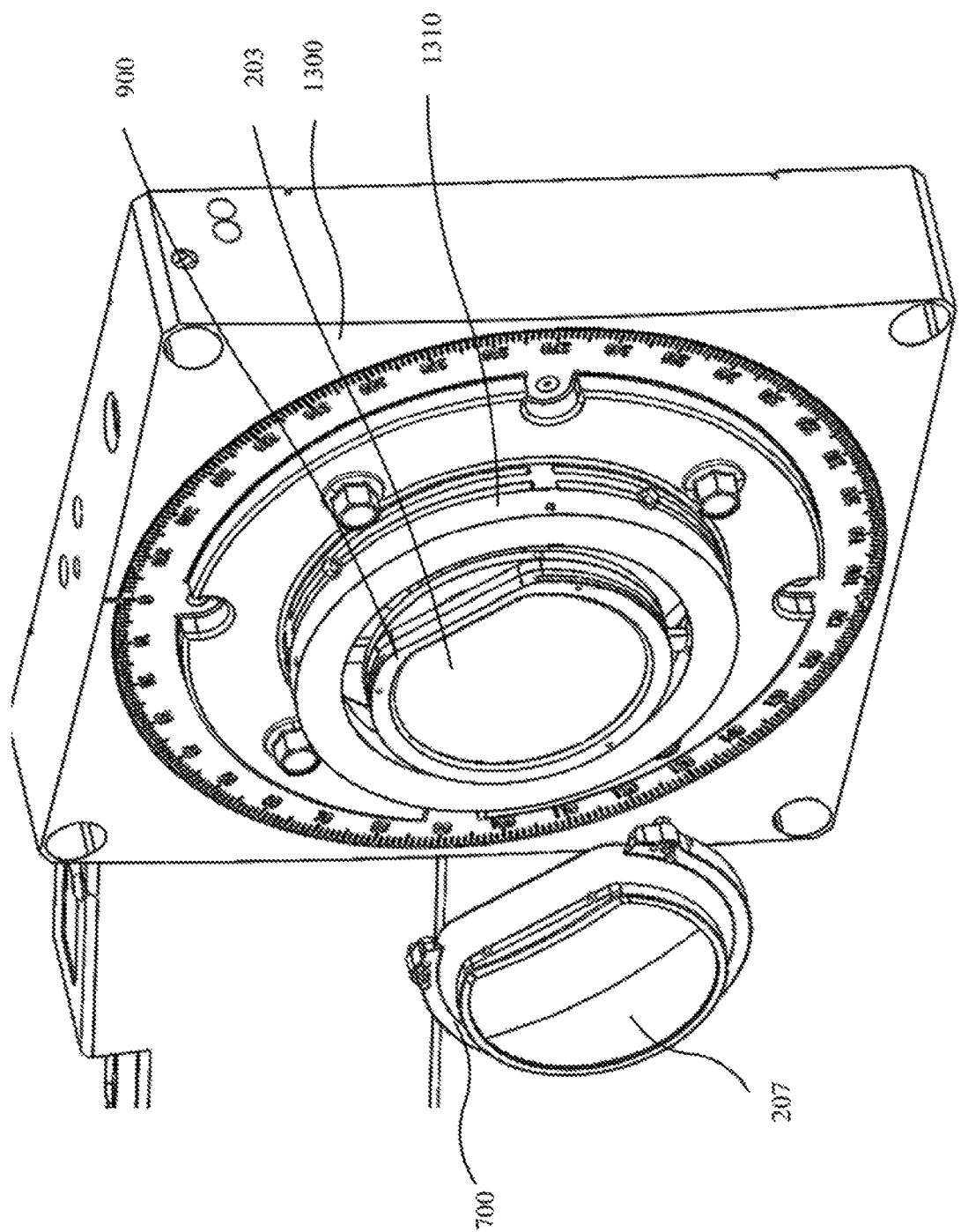
FIG. 15 is a perspective view of the second lens holder and the first lens holder mounted to a rotation stage.

FIG. 15 illustrates the second lens holder 700 and the first lens holder 900 mounted to the rotation stage 1300. The purpose of FIG. 15 is to show that after the first lens holder 900 is mounted to the rotation stage 1300 and the second lens holder 700 is mounted to the rotation stage 1200 (not shown in FIG. 15 for the purpose of clarity), they are moved approaching each other in order to couple with one another, as shown in FIG. 16.

Figure 16:
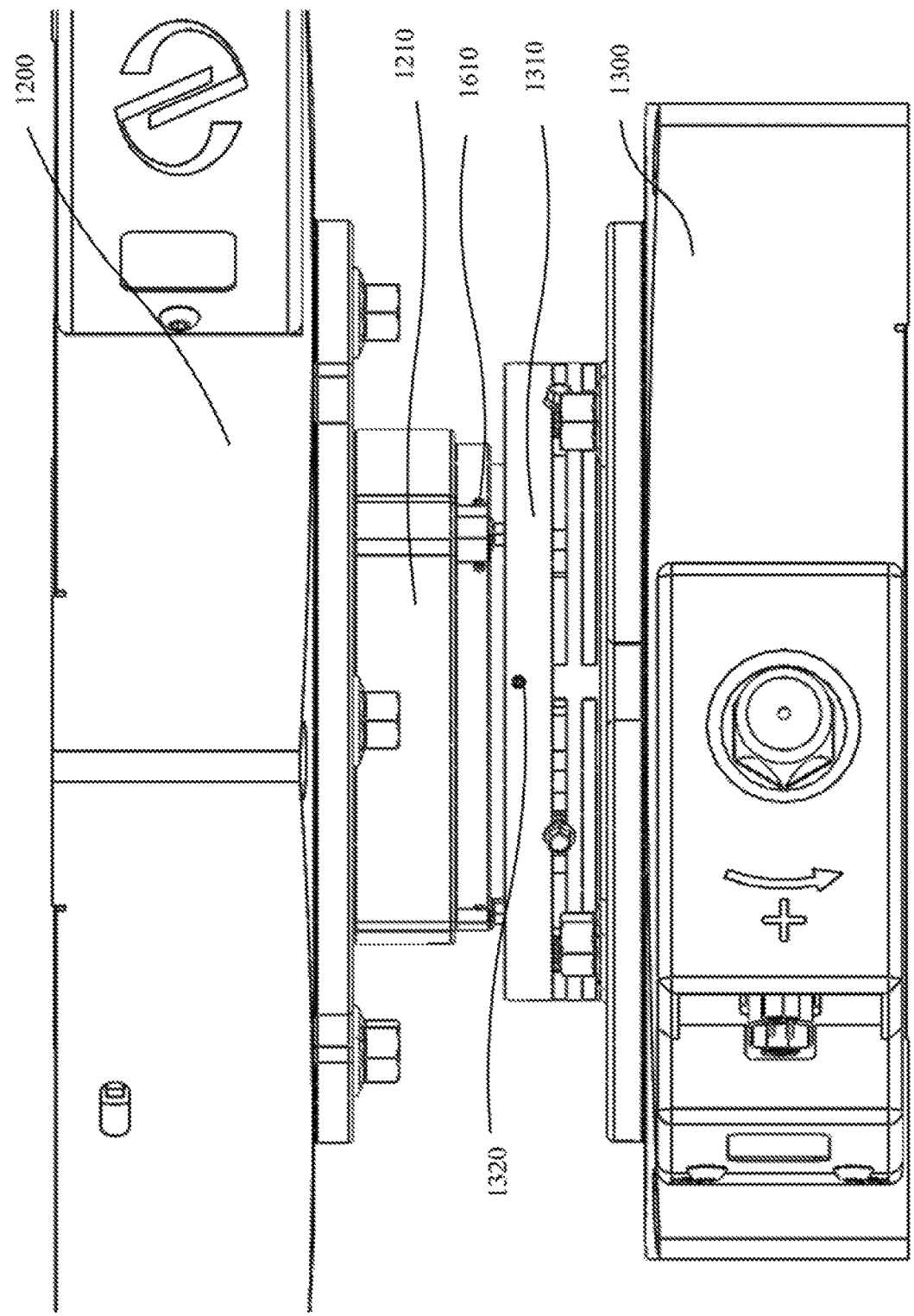
FIG. 16 is a side view showing two rotation stages aligned together.

FIG. 16 illustrates that that the rotation stages 1200 and 1300 are aligned and/or coupled together. At this state, an alignment validation may be performed to verify the polarization alignment between the first lens 203 and the second lens 207, as discussed above in connection with Station 5 shown in FIG. 3. After the first lens 203 and the second lens 207 are aligned, the first lens holder 900 may be separated from the rotation stage 1300 and may be coupled with the second lens holder 700. To transfer the first lens holder 900 from the rotation stage 1300 to the second lens holder 700, screws 1610 provided at side holes 751, 752, 753, and 754 of the second lens holder 700 may be fastened to secure the coupling between the first member 911 of the first lens holder 900 and the second lens holder 700, and screws 1320 on the mounting bracket 1310 may be loosened to release the coupling between the first lens holder 900 and the mounting bracket 1310 of the rotation stage 1300.

Figure 17:
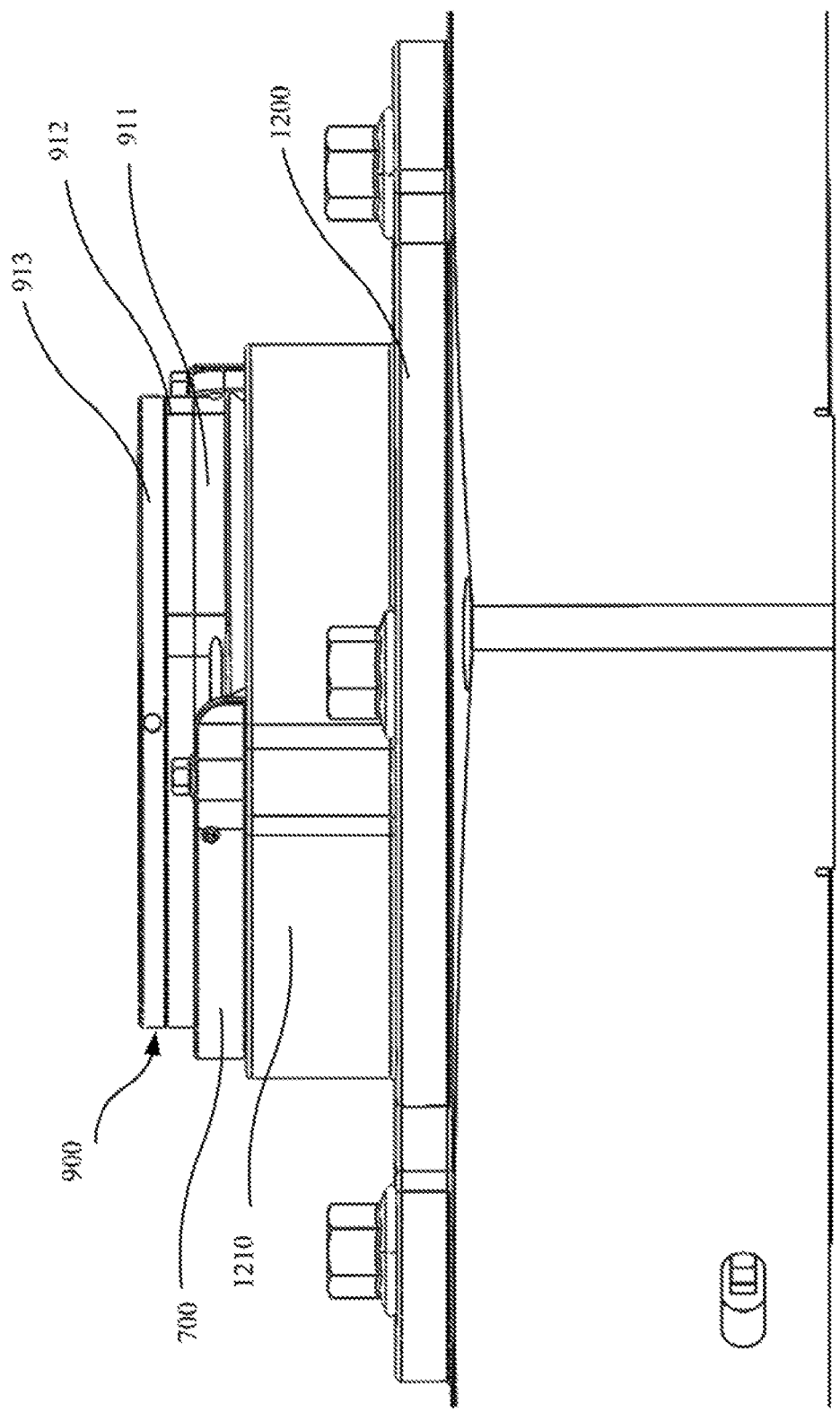
FIG. 17 is a side view of the first lens holder coupled to the second lens holder after a rotation stage is separated from the first lens holder.

FIG. 17 illustrates the first lens holder 900 coupled to the second lens holder 700 after the rotation stage 1300 is separated from the first lens holder 900. As shown in FIG. 17, after the rotation stage 1300 is removed, the second member 912 and the third member 913 of the first lens holder 900 are exposed. For illustrative purposes, a portion of the second lens holder 700 is removed to show the first member 911 of the first lens holder 900.

Figure 18:
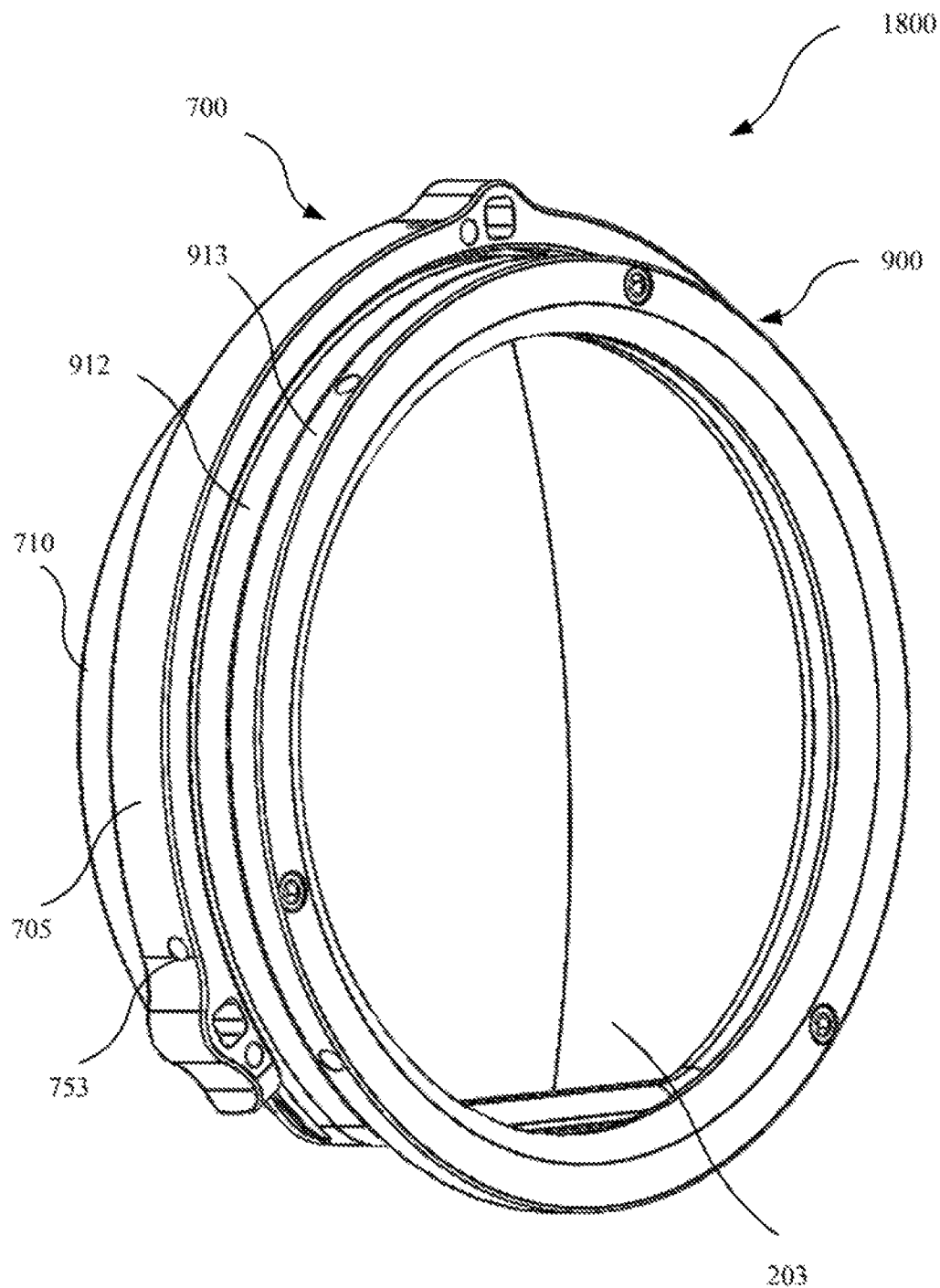
FIG. 18 is a perspective view of an assembly of the first lens holder and the second lens holder, after the rotation stages are removed.

FIG. 18 illustrates a perspective view of an assembly of the first lens holder 900 and the second lens holder 700, if the rotation stages 1200 and 1300 are both removed. The first member 911 of the first lens holder 900 may be secured to the wall portion 720 of the second lens holder 700 through screws 1610 (shown in FIG. 16) inserted into side holes 751, 752, 753, and 754 (only side hole 753 is visible in FIG. 18). In some embodiments, the screws 1610 may be adjusted to adjust the alignment (e.g., the centering) of the first member 911 of the first lens holder 900 (hence the first lens 203) relative to the second lens holder (hence relative to the second lens). That is, in some embodiments, the optical axis of the first lens 203 may be adjusted to align with the optical axis of the second lens 207 by adjusting the screws 1610 provided on the second lens holder that also functions to secure the first member 911 of the first lens holder 900 to the second lens holder 700. The assembly shown in FIG. 18 may be referred to as a housing assembly 1800 for mounting lenses, such as the first lens 203 and the second lens 207. The housing assembly 1800 includes the first lens holder 900 and the second lens holder 700. The second lens holder 700 includes the upper portion 705 and the lower portion 710. As described above in connection with FIG. 7, the upper portion 705 defines a pocket to receive and mount the first lens holder 900. The lower portion 710 is configured to mount the second lens 207.

Figure 19:
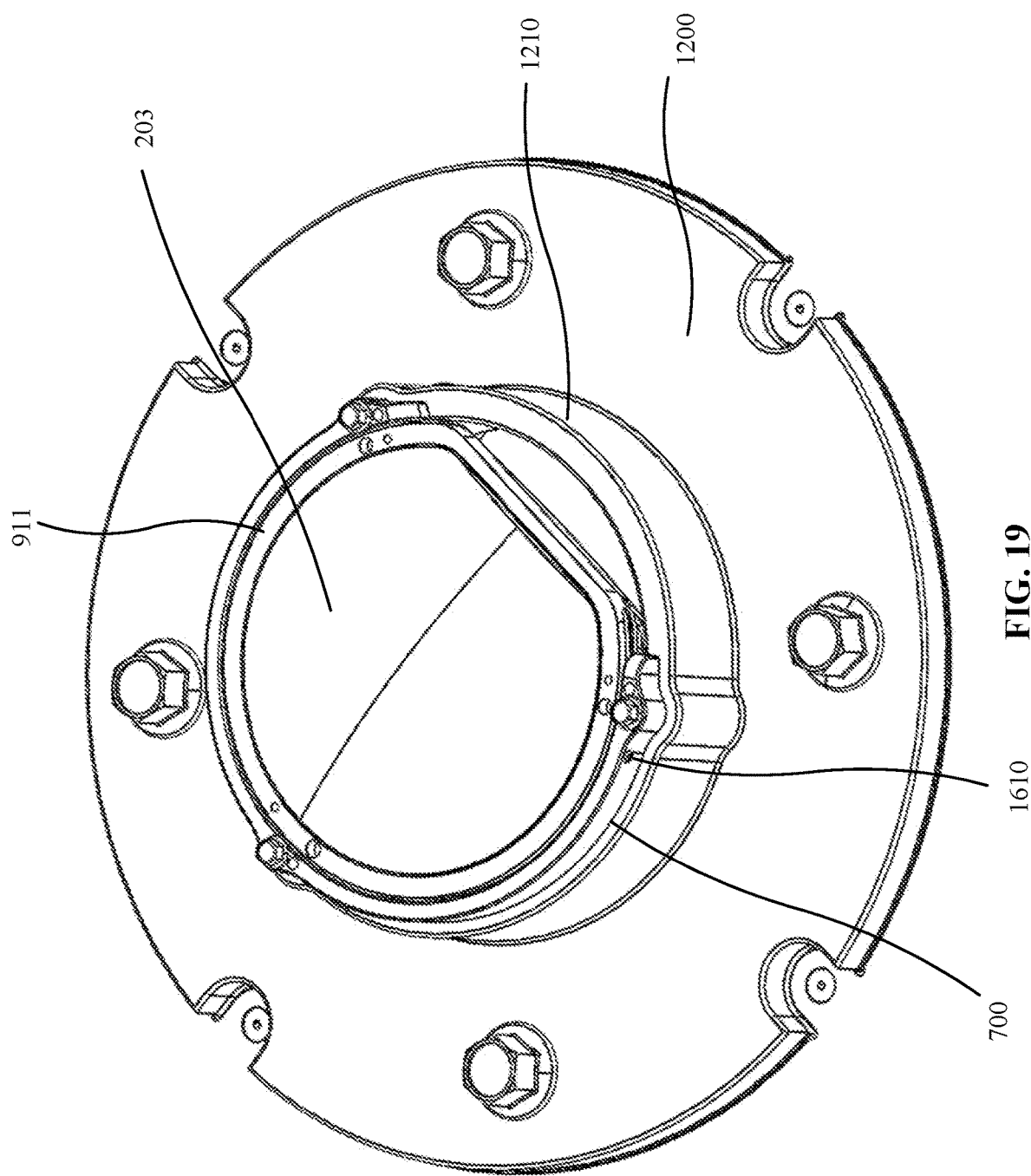
FIG. 19 is a perspective view of the second lens holder mounted to a rotation stage, with the first lens holder coupled to the second lens holder.

FIG. 19 illustrates a perspective view of the second lens holder 700 mounted to the rotation stage 1200, with the first lens holder 900 coupled to the second lens holder 700. The second member 912 and the third member 913 have been removed from the first lens holder 900. The second member 912 and the third member 913 may be removed after an alignment validation using a display has been performed, which is discussed above in connection with Station 5 shown in FIG. 3, and which will also be described below. In the view of FIG. 19, only the first member 911 and the first lens 203 remain in the first lens holder 900. As shown in FIG. 19, the first member 911 (and hence the first lens 203) of the first lens holder 900 may be secured to second lens holder 700 through screws 1610 inserted into side holes 751, 752, 753, and 754 provided on the side wall 720 of the second lens holder 700. Only one screw 1610 is shown in FIG. 19 for illustrative purposes. In some embodiments, the second member 912 and the third member 913 may be removed after the first member 911 is secured to the second lens holder 700 using a suitable method, e.g., using gluing.

Figure 20:
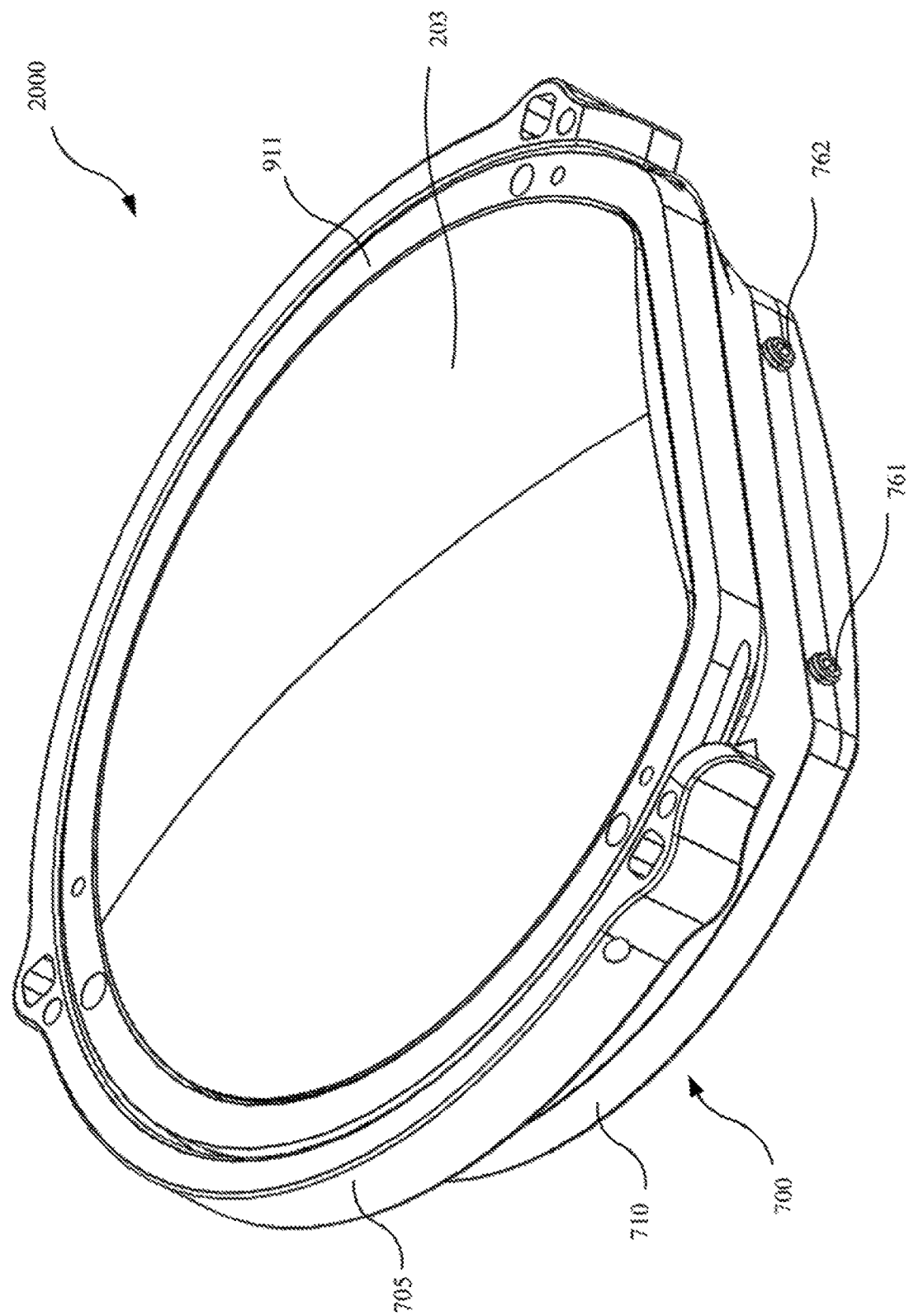
FIG. 20 is a perspective view of an optical assembly including the first lens holder, the first lens mounted to the first lens holder, the second lens holder, and the second lens mounted to the second lens holder.

FIG. 20 is a perspective view of an optical assembly 2000 including the first lens holder 900, the first lens 203 mounted to the first lens holder 900, the second lens holder 700, and the second lens 207 (not visible in FIG. 20) mounted to the second lens holder 700. The first lens holder 900 and the second lens holder 700 are coupled together. The rotation stages 1200 and 1300 have been removed. In addition, in the housing assembly 1800 (shown in FIG. 18), the second member 912 and the third member 913 of the first lens holder 900 have been removed. The first lens 203 and the second lens 207 are aligned to produce a desired polarization effect. The first lens 203 and the second lens 207 may form a polarization sensitive lens. In some embodiments, a first surface (opposite to the surface visible in FIG. 20) of the first lens 203 facing the second lens 207 may be in parallel with a second surface of the second lens 207 facing the first surface of the first lens 203. Each of the first surface of the first lens 203 and the second surface of the second lens 207 may be a flat surface or may be a curved surface. In some embodiments, the first lens 203 and the second lens 207 may be embodiments of the first optical element 101 and the second optical element 102 shown in FIG. 1, respectively. The optical assembly 2000 including the first lens 203 and the second lens 207 may be a polarization sensitive optical assembly.

As shown in FIG. 20 and FIG. 7, the first lens holder 900 may fit with the first opening 725 of the second lens holder 700, and may be supported by the supporting surface 715 (shown in FIG. 7). The first member 911 may rest on the supporting surface 715. The first lens 203 and the second lens 207 may be aligned together such that they produce a desired polarization effect. The optical assembly 2000 may represent a product produced by the full automation assembly line, such as the second assembly and validation line 262 (e.g., at Station 5), in which the centering adjustment and the tilting adjustment of the first lens 203 and the second lens 207 have been completed (in Station 1 and Station 2). In addition, the quarter-wave plate angle adjustment of the first lens 203 and the reflective polarizer angle adjustment have been completed (in Station 3 and Station 4). In some embodiments, to further securing the connection between the first lens holder 900 (e.g., the first member 911) and the second lens holder 700, a glue, such as a UV-curable glue, may be applied to the gap between the second lens holder 700 and the first lens holder 900 to permanently fix the coupling between the first lens holder 900 and the second lens holder 700. In some embodiments, the application of the glue may be performed before the second member 912 and the third member 913 of the first lens holder 900 are removed. In some embodiments, the optical assembly 2000 may represent an intermediate product produced in the process performed through the full automation assembly line, with the final optical device also including a display, as discussed below. FIG. 20 also shows the lower portion 710 and the upper portion 705. Screws 761 and 762 may be configured to secure the second lens 207. In some embodiments, the screws 761 and 762 may be omitted when other securing methods, such as gluing, are used to secure the second lens 207 to the second lens holder 700.

Figure 21:
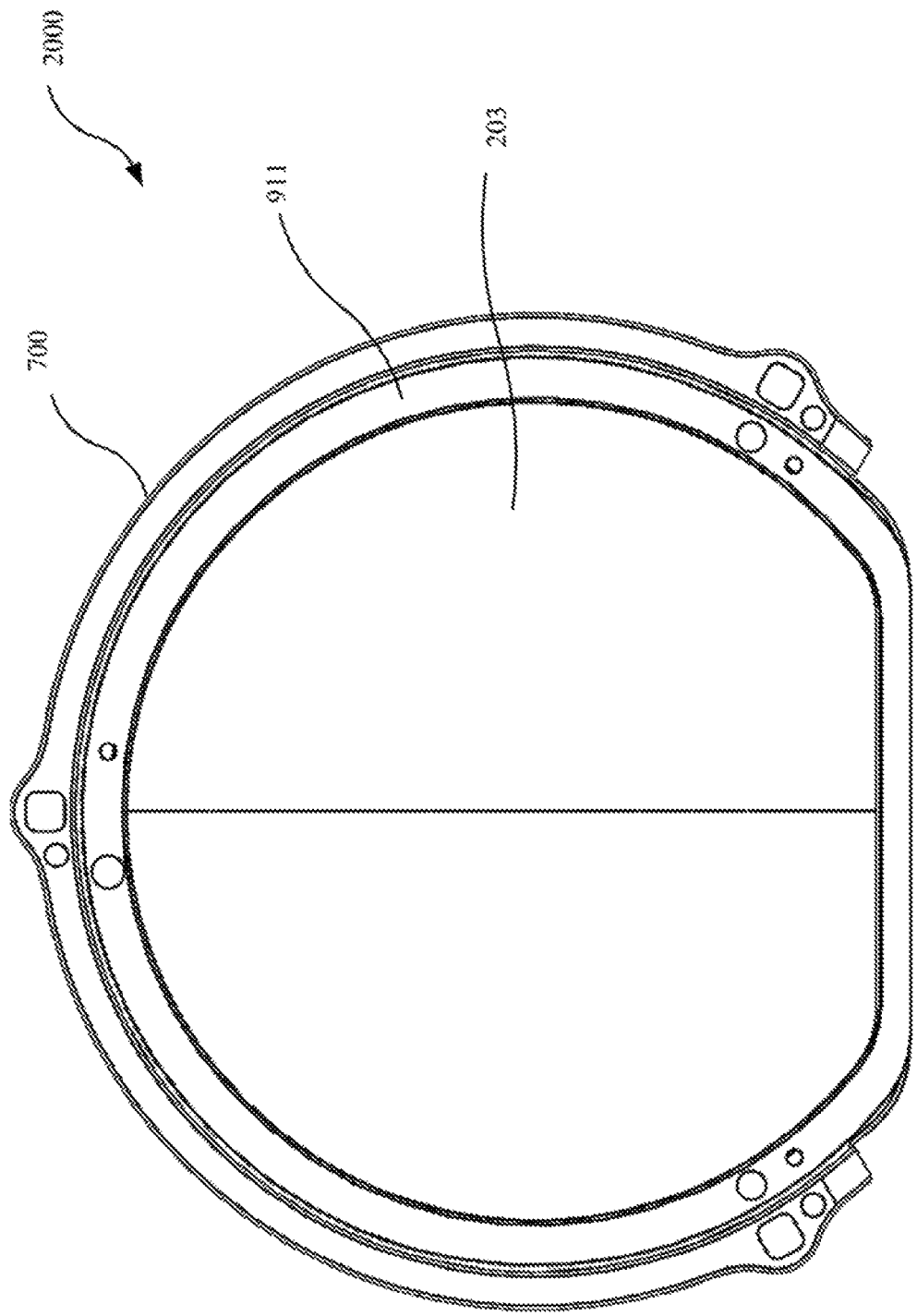
FIG. 21 is a top view of the optical assembly of FIG. 20.

FIG. 21 is a top view of the optical assembly 2000. In the view of FIG. 21, the lower portion 710 of the second lens holder 700 is not visible.

Next, the system for mounting a display will be described. FIG. 22 shows two rotation stages 1200 and 1300 facing each other. The rotation stage 1200 includes the second lens holder 700 mounted thereon. The rotation stage 1300 includes the first lens holder 900 mounted thereon (not visible in FIG. 22). In addition, a display 2200 is mounted to the back of the first lens holder 900 using a display mounting bracket 2210. The display 2200 may be an embodiment of the display 206 shown in FIG. 3.

FIG. 23 shows another perspective view of the two rotation stages. FIG. 23 shows that the two rotation stages 1200 and 1300 are moved close to one another such that the first lens holder 900 (hence the first lens 203) and the second lens holder 700 (hence the second lens 207) may be aligned. For a side view of the two rotation stages coupled together, one can refer to FIG. 16. As shown in FIG. 23, The display 2200 is mounted at the back side of the first lens holder 900 (hence the first lens 203) using the display mounting bracket 2210. The display mounting brackets 2210 may include four arms resting on a supporting surface of the mounting bracket 1310. Four screws, such as four screws 1330 shown in FIG. 13, may be used to secure and adjust the centering of the display mounting bracket 2210 (and hence the display 2200) relative to the centering of the first lens 203. An alignment validation may be performed to verify the polarization alignment between the first lens 203 and the second lens 207. As discussed above in connection with Station 5 shown in FIG. 3, the alignment validation may use the display 2200 (which may be an embodiment of the display 206 shown in FIG. 3) and the camera 354 (shown in FIG. 3). The alignment validation may be performed with the display 2200 mounted to the rotation stage 1300. Depending on the alignment validation results, fine-tuning may be performed to adjust the alignment between the first lens holder 900 and the second lens holder 700. The alignment of the display 2200 (including, e.g., distance, centering, and tilting of the display 2200) with respect to the first lens 203 and the second lens 207 may also be adjusted.

Figure 24:
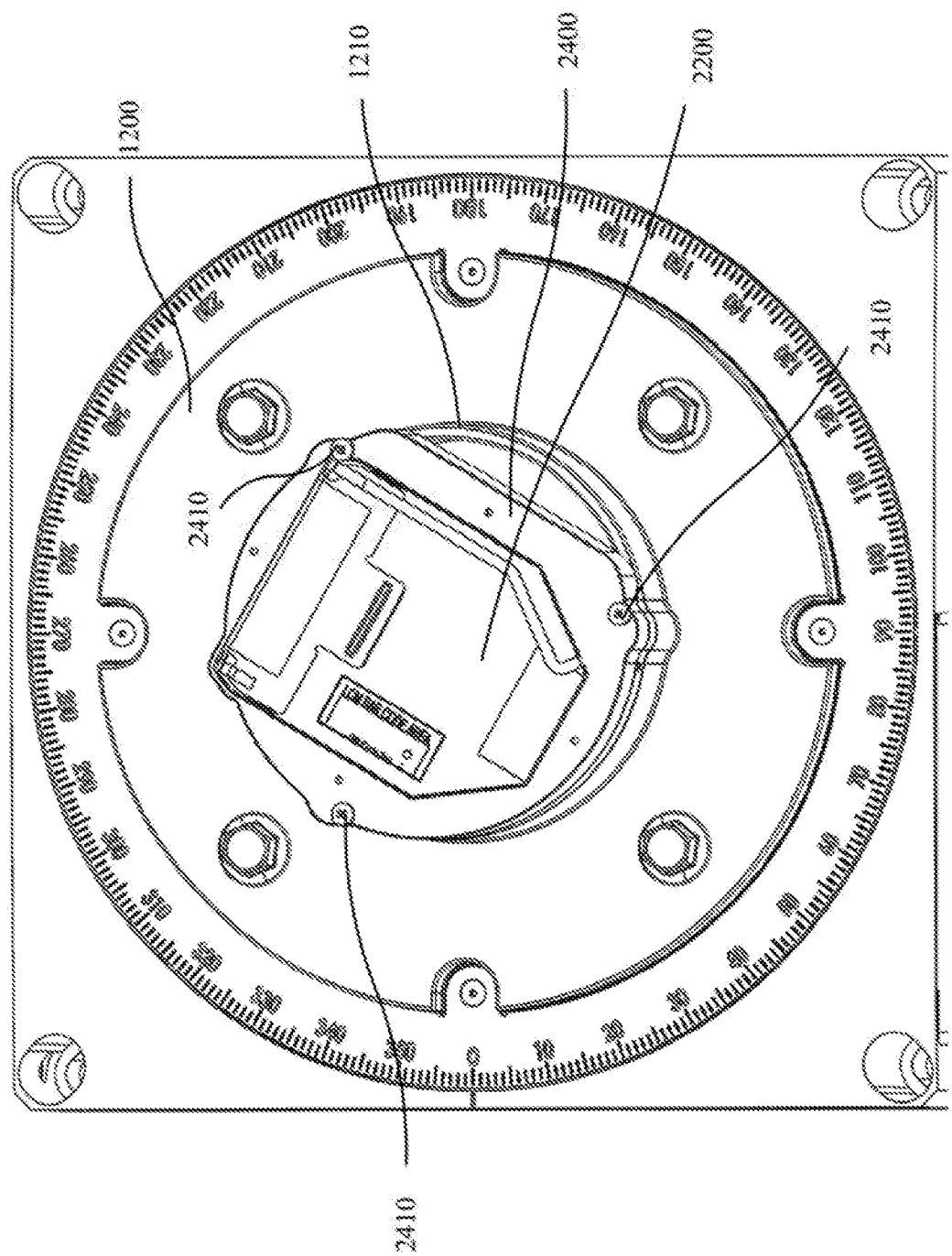
FIG. 24 is a perspective view showing a display attached to the optical assembly through a base cover.

FIG. 24 shows the display 2200 attached to the optical assembly 2000 (not visible in FIG. 24) through a base cover 2400. After the alignment validation is performed using the configuration shown in FIG. 23, the rotation stage 1300 may be removed. The display 2200 may be re-attached to the optical assembly 2000 formed by the second lens holder 700 and the first lens holder 900 (the first member 911 and the first lens 203 only). The display 2200 may be mounted to the base cover 2400, and the base cover 2400 may be mounted to the optical assembly 2200 through screws 2410. Although FIG. 24 shows three screws 2410 for mounting the base cover 2400 to the optical assembly 2000, any other suitable number of screws may be used. Correspondingly, the base cover 2400 may include any suitable number of through holes for receiving the screws. The screws 2410 may be adjusted to change the distance between the display 2200 and the optical assembly 2000 (e.g., the first lens 203), and to change the tilting of the display 2200. The distance between the display 2200 and the optical assembly 2000 also determines the virtual image distance of entire optical device.

Figure 25:
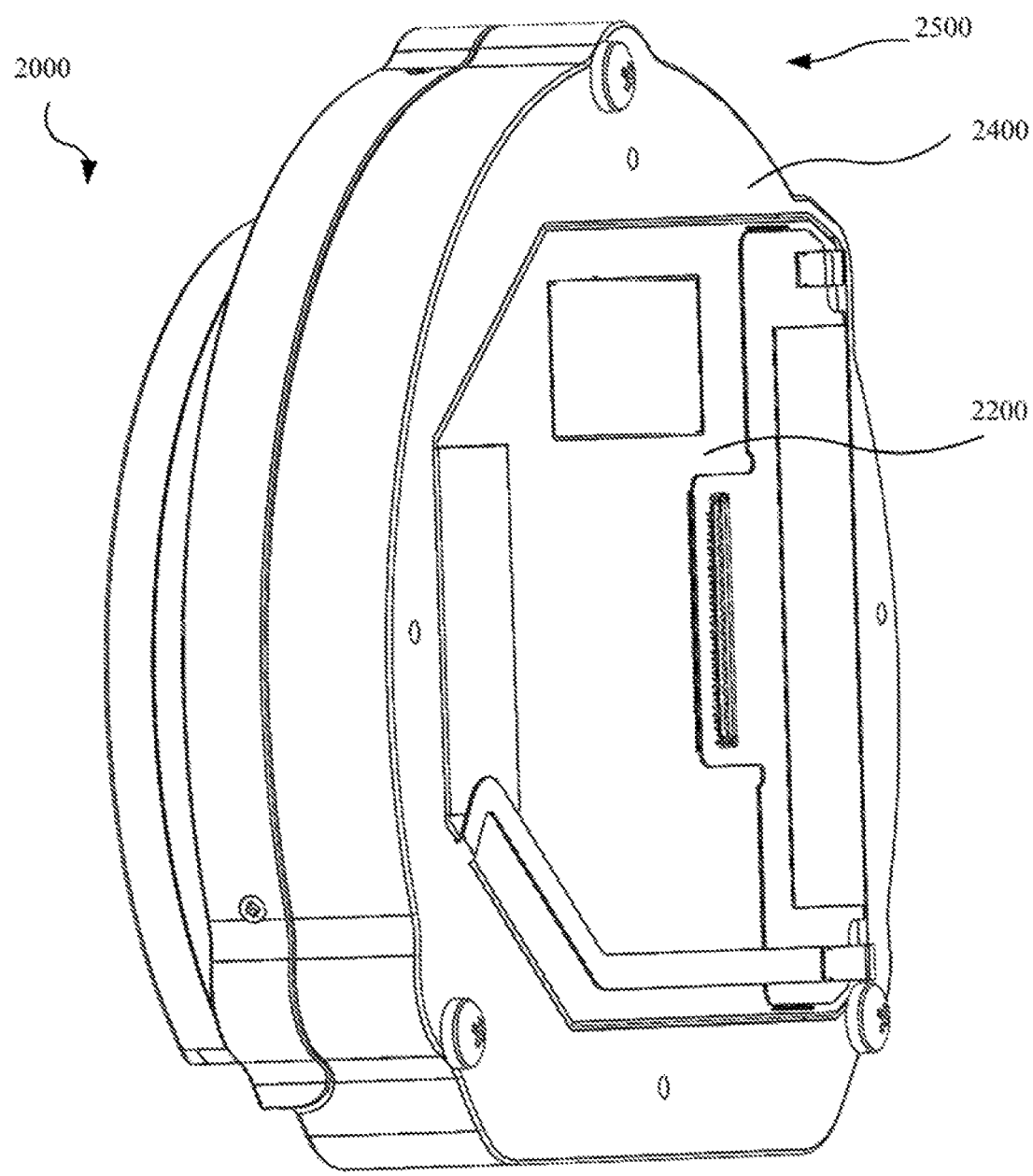
FIG. 25 is a perspective view of an optical device including the optical assembly and the display.

FIG. 25 shows a perspective view of an optical device 2500 including the optical assembly 2000 and the display 2200, with all of the rotation stages removed. FIG. 25 shows a perspective viewed from the side of the base cover 2400.

Figure 26:
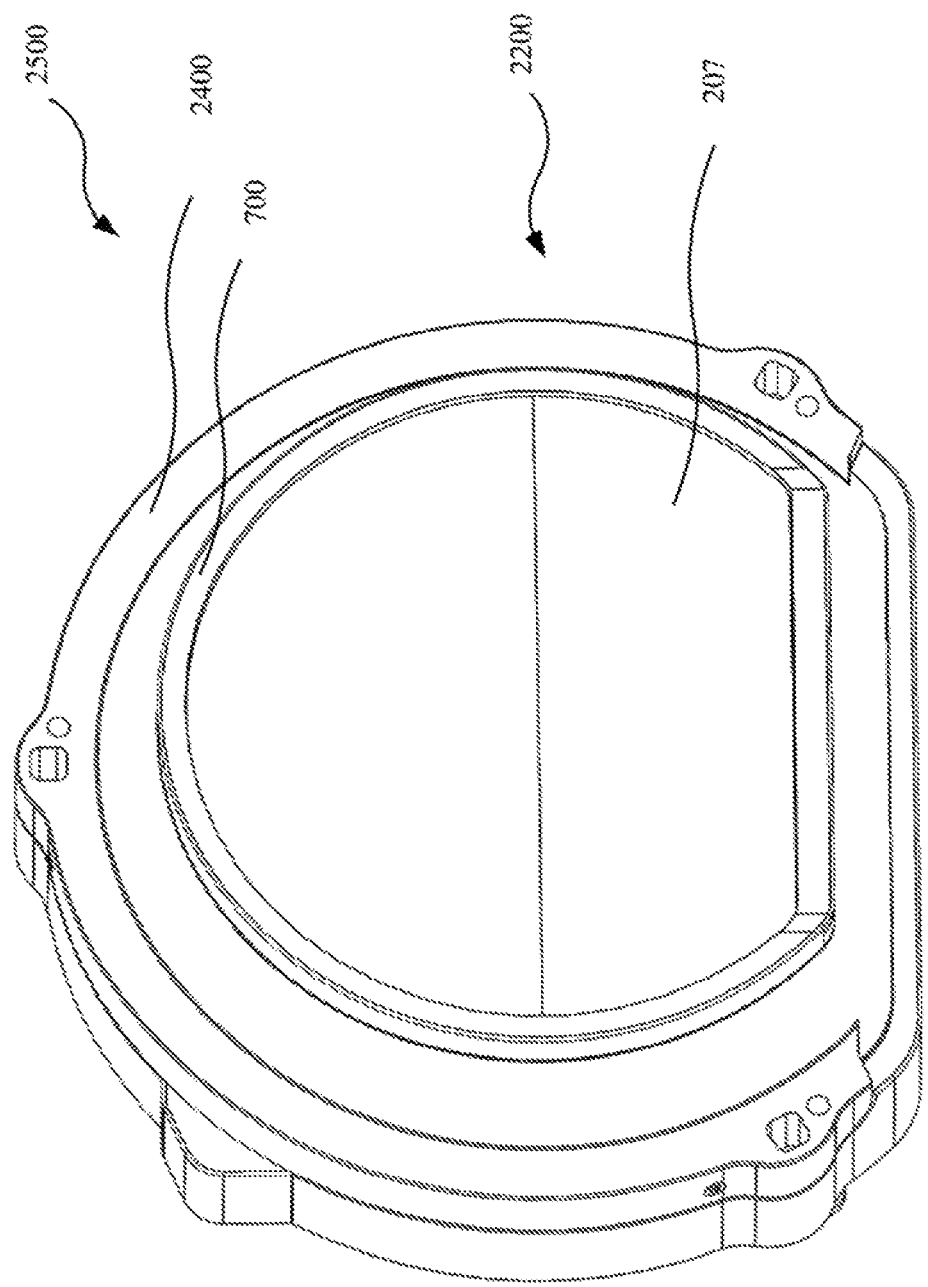
FIG. 26 is a perspective view of the optical device including the optical assembly and the display mounted on the base cover.

FIG. 26 shows a perspective view of the optical device 2500 including the optical assembly 2000 and the display 2200 mounted on the base cover 2400. FIG. 26 shows a perspective viewed from the side of the second lens holder 700.

Figure 27:
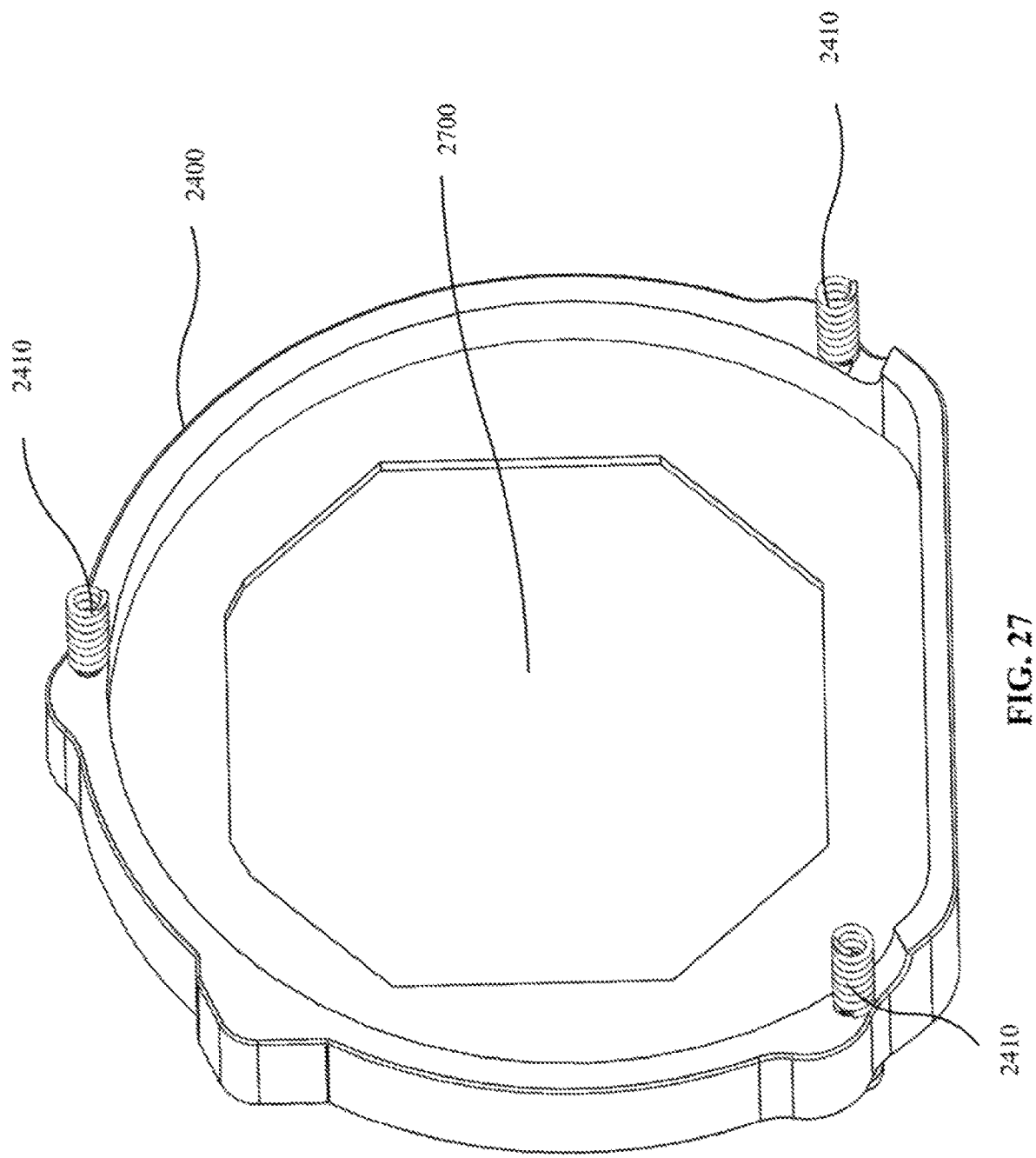
FIG. 27 is a perspective view of the base cover.

FIG. 27 is a perspective view of the base cover 2400. As shown in FIG. 27, the base cover 2400 may include an opening 2700 in the center for receiving and mounting the display 2200. The opening 2700 may include a shape that matches the shape of the display 2200.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer).

Additionally, in some embodiments, artificial reality may also be associated with applications, products, accessories, services, or some combination thereof, which are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Various embodiments have been described to illustrate the exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A housing assembly for mounting a first lens and a second lens, comprising:
a first lens holder comprising a ring-shaped structure configured to mount the first lens; and
a second lens holder comprising a cup-shaped structure, the cup-shaped structure comprising an upper portion configured to mount the first lens holder, and a lower portion configured to mount the second lens,
wherein the upper portion of the second lens holder comprises a supporting surface configured to support the first lens holder and a wall portion extending from the supporting surface toward the first lens holder, and
wherein the first lens holder is mounted to the second lens holder, and the upper portion of the second lens holder comprises a plurality of side holes penetrating through the wall portion of the upper portion in a radial direction parallel to the supporting surface of the second lens holder, the side holes configured to receive a plurality of screws for securing the first lens holder to the second lens holder, and for adjusting an alignment between the first lens holder and the second lens holder.

2. The housing assembly of claim 1, wherein the cup-shaped structure comprises a first opening provided at the upper portion and a second opening provided at the lower portion, the first opening having a first dimension that is greater than a second dimension of the second opening.

3. The housing assembly of claim 1, wherein the wall portion extends perpendicularly from the supporting surface toward the first lens holder.

4. The housing assembly of claim 1, wherein the wall portion comprises a plurality of ear portions configured to mount on a mounting bracket of a rotation stage.

5. The housing assembly of claim 4, wherein each of the plurality of ear portions comprises one or more vertical holes configured to receive one or more screws, at least one of the one or more screws being adjustable to change at least one of a centering of the second lens or a tilting of the second lens.

6. The housing assembly of claim 1, wherein the first lens holder comprises a first member configured to mount the first lens, and wherein the first member comprises a plurality of side holes provided on a circumferential side to receive a plurality of screws for securing the first lens.

7. The housing assembly of claim 6, wherein the first lens holder further comprises:
a second member;
a third member,
wherein the first member, the second member, and the third member are stacked together with the second member disposed between the first member and the third member.

8. The housing assembly of claim 7, wherein the first lens holder further comprises:
one or more springs disposed between a lower portion of the third member and a surface top portion of the first member, the one or more springs being in a compressed state when the first member and the third member are connected.

9. The housing assembly of claim 8, wherein the first lens holder further comprises:
one or more screws configured to connect the first member with the third member,
wherein the one or more screws are configured to be adjustable to cause a tilting of the first lens to be changed by a resilient force exerted by the one or more springs.

10. The housing assembly of claim 8, wherein the first lens holder further comprises:
one or more screws configured to connect the third member with the second member.

11. The housing assembly of claim 7, wherein the third member further comprises one or more side holes provided on a side wall of the third member and configured to receive one or more screws that secure the third member to a mounting bracket of a rotation stage.

12. An optical assembly, comprising:
a first lens holder;
a first lens mounted to the first lens holder;
a second lens holder; and
a second lens mounted to the second lens holder,
wherein the first lens holder is mounted to the second lens holder, and the first lens is aligned with the second lens, and
wherein the second lens holder comprises a cup-shaped structure having an upper portion configured to mount the first lens holder, and a lower portion configured to mount the second lens,
wherein the upper portion of the second lens holder comprises a supporting surface configured to support the first lens holder and a wall portion extending from the supporting surface toward the first lens holder, and
wherein the upper portion of the second lens holder comprises a plurality of side holes penetrating through the wall portion of the upper portion in a radial direction parallel to the supporting surface of the second lens holder, the side holes configured to receive a plurality of screws for securing the first lens holder to the second lens holder, and for adjusting an alignment between the first lens holder and the second lens holder.

13. The optical assembly of claim 12, wherein the first lens holder comprises a ring-shaped structure.

14. The optical assembly of claim 12, wherein the cup-shaped structure comprises a first opening provided at the upper portion and a second opening provided at the lower portion, the first opening is larger than the second opening.

15. An optical device, comprising:
an optical assembly, comprising:
a first lens holder;
a first lens mounted to the first lens holder;
a second lens holder; and
a second lens mounted to the second lens holder,
wherein the first lens holder is mounted to the second lens holder, and the first lens is aligned with the second lens,
wherein the second lens holder comprises a cup-shaped structure having an upper portion configured to mount the first lens holder, and a lower portion configured to mount the second lens, wherein the upper portion of the second lens holder comprises a supporting surface configured to support the first lens holder and a wall portion extending from the supporting surface toward the first lens holder, and
wherein the upper portion of the second lens holder comprises a plurality of side holes penetrating through the wall portion of the upper portion in a radial direction parallel to the supporting surface of the second lens holder, the side holes configured to receive a plurality of screws for securing the first lens holder to the second lens holder, and for adjusting an alignment between the first lens holder and the second lens holder;

a display; and a base cover configured to mount the display, the base cover being mounted to the second lens holder of the optical assembly.

16. The optical assembly of claim 12, wherein the first lens is aligned with the second lens with a surface of the first lens being in parallel with a surface of the second lens.

17. The optical device of claim 15, wherein the first lens is aligned with the second lens with a surface of the first lens being in parallel with a surface of the second lens.

* * * * *